United States Patent
Fukutani et al.

(10) Patent No.: US 9,827,880 B2
(45) Date of Patent: Nov. 28, 2017

(54) VEHICLE SEAT

(71) Applicant: TACHI-S CO., Ltd., Tokyo (JP)

(72) Inventors: Minoru Fukutani, Tokyo (JP); Norito Akimoto, Tokyo (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 15/598,739

(22) Filed: May 18, 2017

(65) Prior Publication Data

US 2017/0253147 A1    Sep. 7, 2017

Related U.S. Application Data

(62) Division of application No. 14/334,083, filed on Jul. 17, 2014, now Pat. No. 9,676,299.

(30) Foreign Application Priority Data

Jul. 19, 2013  (JP) ................................. 2013-150467
Jul. 19, 2013  (JP) ................................. 2013-150468
Jul. 19, 2013  (JP) ................................. 2013-150469
Jul. 19, 2013  (JP) ................................. 2013-150470

(51) Int. Cl.
  *A47C 4/04*  (2006.01)
  *B60N 2/12*  (2006.01)
  (Continued)

(52) U.S. Cl.
  CPC .................. *B60N 2/12* (2013.01); *A47C 4/04* (2013.01); *B60N 2/06* (2013.01); *B60N 2/07* (2013.01);
  (Continued)

(58) Field of Classification Search
  CPC ... A47C 4/04; B60N 2/12; B60N 2/06; B60N 2/07
  (Continued)

(56) References Cited

U.S. PATENT DOCUMENTS 7,100,984 B2 * 9/2006 Epaud .................... B60N 2/06
                                                    297/341

FOREIGN PATENT DOCUMENTS

CN      1461711 A    12/2003
CN    101351357 A    1/2009
(Continued)

OTHER PUBLICATIONS

Akutsu et al., Seat for Vehicles, Apr. 12, 2013, Japanese Patent application, Japanese Patent Office.
(Continued)

*Primary Examiner* — Syed A Islam
(74) *Attorney, Agent, or Firm* — Ostrolenk Faber LLP

(57) ABSTRACT

Vehicle seat including: a seat back pivoted to a side of the floor, a seat cushion pivoted to the seat back; and a front leg element having an upper end pivoted to the seat cushion and a lower end pivotally locked to the side of floor in a releasable manner, thus normally providing a four-pivotal-point linkage in the seat. Maintaining the four-pivotal-point linkage adversely restricts design and actions of the seat. Inequality conditions are therefore set in that four-pivotal-point linkage, such that folding down the seat back by an angle exceeding a predetermined angle results in unlocking of the lower end of the front leg element from the side of floor, thereby destroying the four-pivotal-point linkage. Hence, a freedom of design is increased for the seat and floor. Further, leverage mechanism(s) may be provided to facilitate the ease of unlocking the front leg element from the side of floor.

12 Claims, 14 Drawing Sheets

(51) Int. Cl.
    *B60N 2/06* (2006.01)
    *B60N 2/30* (2006.01)
    *B60N 2/07* (2006.01)
(52) U.S. Cl.
    CPC ......... *B60N 2/3013* (2013.01); *B60N 2/3047* (2013.01); *B60N 2/3065* (2013.01)
(58) Field of Classification Search
    USPC .................................. 297/16.1, 344.1, 378.1
    See application file for complete search history.

(56) References Cited

FOREIGN PATENT DOCUMENTS

| CN | 105073490 A | 11/2015 |
|---|---|---|
| CN | 105121222 A | 12/2015 |
| FR | 2886590 A1 | 12/2006 |
| JP | 2005-067325 | 3/2005 |
| JP | 2005-212554 A | 8/2005 |
| JP | 2008-030657 A | 2/2008 |
| JP | 2014-205429 A | 10/2014 |
| WO | WO 2014167956 A1 | 10/2014 |
| WO | WO 2014168233 A1 | 10/2014 |

OTHER PUBLICATIONS

Nakamura et al., Vehicular seat device, Apr. 12, 2013, Japanese Patent application, Japanese Patent Office.
Notice of Reasons for Rejection dated May 19, 2015 relative to related JP Appln. No. 2013-150467, and English translation.
Office Action dated May 27, 2016 relative to Chinese Patent Application No. 2014103427691 with English translation.

* cited by examiner

VEHICLE SEAT

CROSS-REFERENCE TO RELATED APPLICATIONS

This application is a divisional of U.S. patent application Ser. No. 14/334,083, filed Jul. 17, 2014, which claims the benefit of Japanese Patent Application Nos. 2013-150467, 2013-150468, 2013-150469 and 2013-150470, filed Jul. 19, 2013, the contents of all of which are incorporated herein by reference.

BACKGROUND OF THE INVENTION

1. Field of the Invention

The present invention relates to a vehicle seat of the type wherein its seat cushion and seat back are operatively interconnected via a linkage arranged among pivotal points associated with the seat cushion, the seat back and a floor of vehicle. The seat back can be folded onto the seat cushion, with the rear surface of the seat back being exposed upside, and thereafter, the seat cushion with the seat back folded thereon be displaced to a storage position, so that the rear surface of the seat back can be used as a loading area or baggage loading area in the vehicle including an automobile.

2. Description of Prior Art

One example of conventional vehicle seats of this kind is disclosed in Japanese Laid-Open Patent Publication 2005-067325 (JP 2006-067325 A1). As shown therein, four pivotal points are defined in the following fashion: i) a lower end portion of a seat back frame is pivotally connected to a seat slide device's upper rail fixed on a floor, thus providing a first pivotal point; ii) a rear end portion of a seat cushion frame is pivotally connected to the seat back frame, thus providing a second pivotal point; iii) a front link is at its upper end pivotally connected to a front end portion of the sea cushion frame, thus providing a third pivotal point; and iv) a lower end of the front link is pivotally secured to the floor, thus providing a fourth pivotal point.

Due to such four pivotal points, a parallel linkage is established among the seat back frame, seat cushion frame, front link, and floor, so that, whenever the seat is folded and moved forwardly and rearwardly, the seat cushion frame and the floor are always maintained in parallel with each other, while the front link and the seat back frame's lower end portion are also always maintained in parallel with each other.

In this sort of seat, however, it is required for a technical designer to set the front link or the afore-said fourth pivotal point within a limited range of positions in order to insure maintaining the parallel linkage described above. Further, the fact that the lower end of the front link has a fixed pivotal connection with the floor necessitates the designer to consider a degree of load that will be directly applied to the front link and adjustingly set a position of the front link's upper end to the seat cushion frame, depending on such degree of load, while insuring that the parallel linkage is maintained. As such, setting a position of the front link to the seat cushion frame and floor (i.e. the third and fourth pivotal points) is actually limited, which means a less freedom of setting the front link thereto, thus limiting a freedom of design for the seat. Moreover, the seat of this Japanese prior art requires forward and rearward sliding of the seat back via upper and lower rails, of the seat slide devices to permit forward folding of the seat back onto the seat cushion completely. Consequently, when the upper rail is locked to the lower rail, the seat back is thereby limited as to its forward folding and can be folded at a small angle of inclination, and therefore, under the locked state of seat slide devices, the seat back can not completely be folded down to the seat cushion.

SUMMARY OF THE INVENTION

In view of the afore-stated drawbacks, it is a primary purpose of the present invention to provide a vehicle seat of the type having a four-pivotal-point linkage, which makes it possible to increase a freedom of setting a leg element thereof to a seat cushion, thereby increasing a freedom of design for the seat.

In order to achieve such purpose, in accordance with the present invention, there is provided a vehicle seat for use with a vehicle having a floor therein, which basically comprises:

a seat back frame provided in a seat back, the seat back frame being at a lower end thereof pivotally connected to the floor, thus defining a first pivotal point between the seat back frame and the floor;

a seat cushion frame provided in a seat cushion, the seat cushion frame being at a rearwardly-facing end thereof pivotally connected to the seat back frame, thus defining a second pivotal point between the rearwardly-facing end of the seat cushion frame and the seat back frame;

a leg element having an upper end pivotally connected to a forward portion of the seat cushion frame at a point anteriorly of the second pivotal point, thus defining a third pivotal point between the upper end of the leg element and the seat cushion frame; and a lock device fixedly disposed at the floor, wherein a lower end portion of the leg element is releasably engaged in the lock device, thereby being normally in a locked relation with the floor, thus defining a fourth pivotal point between the lower end portion of the leg element and the floor.

In other words, the first, second, third and fourth pivotal points establish a four-pivotal-point linkage among the seat back frame, the seat cushion frame, the front leg element and the floor. This four-pivotal-point linkage is normally maintained, but, when the seat back frame is rotated forwardly and downwardly relative to the first pivotal point by an angle exceeding a predetermined angle, the lower end of the leg element is disengaged from the lock device, thereby destroying the four-pivotal-point linkage.

Accordingly, the leg element, which restricts the design and actions of the seat having this kind of four-pivotal-point linkage, can be released from the fourth pivotal point, which destroys the four-pivotal-point linkage. This allows increasing of a freedom of setting the leg element to the seat cushion, thereby increasing a freedom of design for the seat, and further allows both seat cushion and seat back to be completely folded down towards the floor, irrespective of whether a seat slide device or other elements may be provided between the seat and floor.

Preferably, the lock device may be so formed to include an engagement portion defined inside thereof and a resiliently biasing portion, with such an arrangement that the lower end portion of the front leg element is normally engaged in the engagement portion of the lock device and prevented by the resiliently biasing portion from being removed from the engagement portion and that the lock device permits the lower end portion of the front leg element to be drawn and disengaged from the engagement portion thereof against a biasing force of the resiliently biasing portion, while permitting the lower end portion to be inserted and engaged in the engagement portion thereof against the biasing force of the resiliently biasing portion.

As one aspect of the invention, the seat may include an element with which a lower part of the front leg element near to the fourth pivotal point is to be contacted, thereby limiting movement of the front leg element at the element, wherein the element is defined at or adjacent to the floor and forms a fulcrum. Further, the third pivotal point may form a point of force application, to which a force is to be applied from the seat back frame, and the lower end portion of the front leg element may form a point of action against the lock device, whereupon a leverage is provided to the front leg element. When the seat back frame is rotated forwardly and downwardly relative to the first pivotal point by an angle exceeding a predetermined angle, the lower part of the front leg element comes into contact with the element, whereby the force applied from the seat back frame is amplified under the leverage to facilitate disengagement of the lower end portion of the front leg element from the lock device.

Essentially, the above-described four-pivotal-point linkage may be arranged such that, letting a first distance to be set between the first and second pivotal points, letting a second distance to be set between the second and third pivotal points, letting a third distance to be set between the third and fourth pivotal points, and letting a fourth distance to be set between the fourth and first pivotal points, a sum of the first and second distances is not equal to or not smaller than a sum of the third and fourth distances.

Preferably, a guide element may be disposed between the lock device and the floor, the guide element being so configured and sloped as to allow the end portion of the front leg element to be guided therealong in a direction from the lock device towards the floor. This d guide element includes: an upper end portion disposed adjacent to and anteriorly of the lock device; and a lower end portion extending downwardly and aslant towards the floor.

As another aspect of the invention, an under cover may be provided between the seat cushion frame and the floor, the under cover including a guide portion disposed between the lock device and the floor, wherein the guide portion is so configured and sloped as to allow the end portion of the front leg element to be guided therealong in a direction from the lock device towards the floor. Such guide portion includes: an upper end portion disposed adjacent to and anteriorly of the lock device; and a lower end portion extending downwardly and aslant towards the floor.

In addition, the under cover may be so formed to include a portion with which a lower part of the front leg element near to the fourth pivotal point is to be contacted, thereby limiting movement of the front leg element at the portion, wherein the portion forms a fulcrum. The third pivotal point forms a point of force application, to which a force is to be applied from the seat back frame. The lower end portion of the front leg element forms a point of action against the lock device. In that manner, a leverage is provided to the front leg element. When the seat back frame is rotated forwardly and downwardly relative to the first pivotal point by an angle exceeding a predetermined angle, the lower part of the front leg element comes into contact with the portion of the under cover, whereby the force applied from the seat back frame is amplified under the leverage to facilitate disengagement of the lower end portion of the front leg element from the lock device.

Preferably, an auxiliary leg element may be provided to a bottom side of a forwardly-facing end portion of the seat cushion frame so as to be suspended therefrom.

As still another aspect of the invention, a seat for use with a vehicle having a floor therein may be comprised of:
a seat slide device operable for adjustment in position of the seat in forward and rearward directions of the seat, the seat slide device including: a lower rail element fixedly mounted on the floor; and an upper rail element slidably engaged with the lower rail element;
a seat back frame provided in a seat back, the seat back frame being at a lower end thereof pivotally connected to the upper rail element of the seat slide device, thus defining a first pivotal point between the seat back frame and the upper rail element;
a seat cushion frame provided in a seat cushion, the seat cushion frame being at a rearwardly-facing end thereof pivotally connected to the seat back frame, thus defining a second pivotal point between the seat cushion frame and the seat back frame;
a leg element having an upper end pivotally connected to a forward portion of the seat cushion frame at a point anteriorly of the second pivotal point, thus defining a third pivotal point between the upper end of the leg element and the seat cushion frame; and
a lock device fixedly disposed at a location substantially corresponding to the upper rail element;
wherein a lower end of the leg element is releasably engaged in the lock device, thereby being normally in a locked relation with the upper rail element of the seat slide device, thus defining a fourth pivotal point between the lower end of the leg element and the upper rail element.

This mode of seat incorporating the seat slide device may also be changed in its parts and elements in substantially the same way as described in the preceding modes.

Other various features and advantages will become apparent from reading of the description, hereinafter, with reference to the accompanied drawings.

DETAILED DESCRIPTION OF PREFERRED EMBODIMENTS OF THE INVENTION

Figure 1:
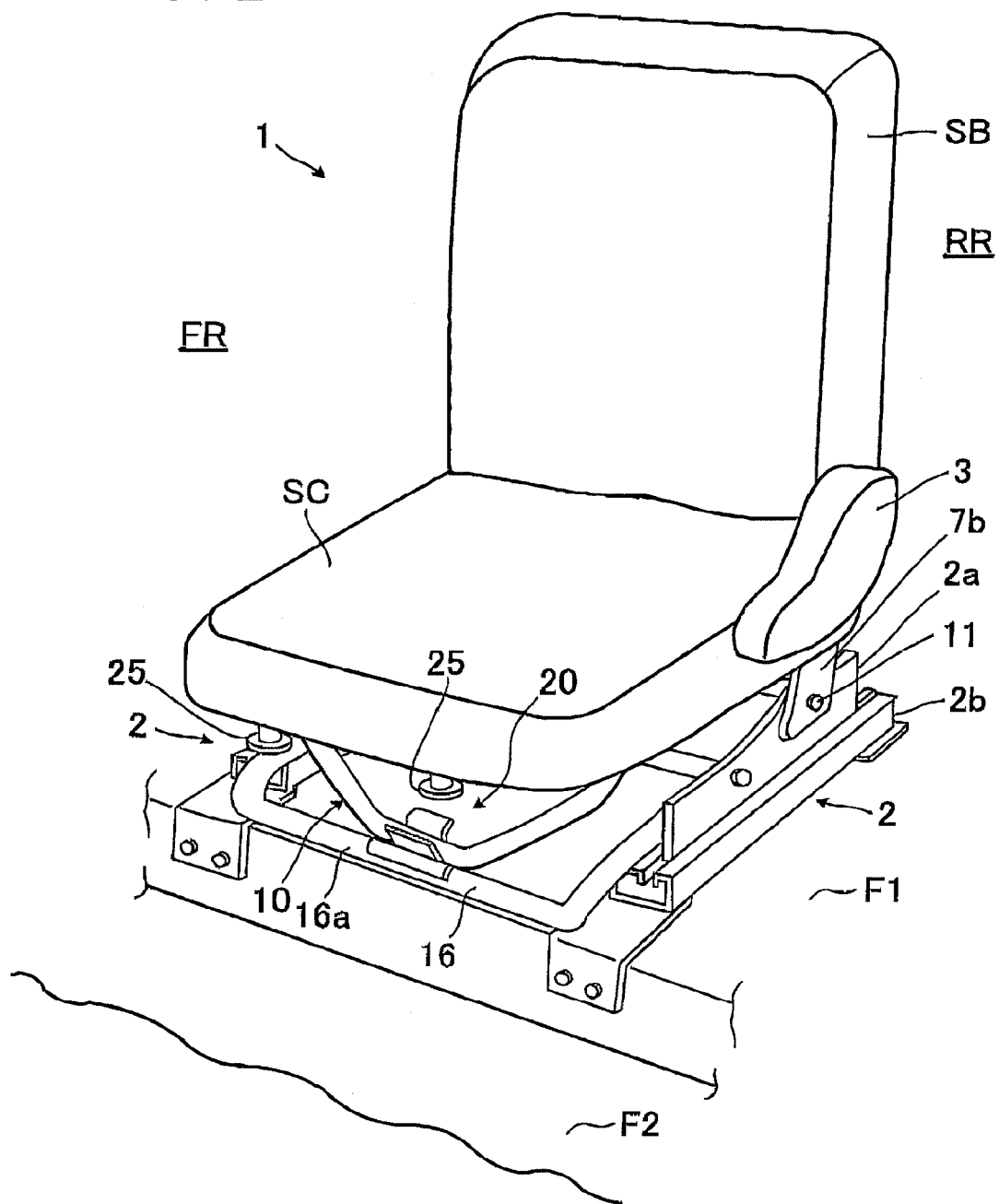
FIG. 1 is a perspective view of a vehicle seat to which a principal part of the present invention is applied, in association with a first exemplary embodiment of the invention.

FIG. 1 shows, in perspective, one exemplary mode of vehicle seat in accordance with the present invention. Throughout all the Figures, the vehicle seat per se is generally designated by 1, which includes a seat cushion SC and a seat back SB foldable forwardly and downwardly onto the seat cushion SC. Designation 3 denotes a reclining device operable to adjustably incline the seat back SB relative to the seat cushion SC.

Hereinafter, it is noted that the wording, "forward", "forwardly" and "front", refer to a direction toward a forward side FR of the seat 1, whereas the wording, "rearward", "rearwardly" and "rear", refer to a direction toward a rearward side RR of the seat 1.

First of all, in all the embodiments to be hereinafter described, the vehicle seat 1 of the present invention is based on a four-pivotal-point linkage mechanism which includes one releasable pivotal point among the four pivotal points thereof. Namely, referring FIGS. 2 to 4 in conjunction with FIG. 1, it is to be understood generically that:

a) the seat back SB is at its lower end portion (at 7b) pivotally connected to a side of floor (at F1), thus providing a first pivotal point (at 11);

b) the seat cushion SB is at its rear end portion (at 6b) pivotally connected to a lower end portion of the seat back SB, thus providing a second pivotal point (at 12);

c) a front leg element 10 is at its upper end portion pivotally connected to a forward portion of the seat cushion, thus providing a third pivotal point (at 13); and d) the front leg element 10 is its lower end portion pivotally connected to a forward end portion of load-receiving support element 16 fixed on a side of floor (at F1), thus providing a fourth pivotal point (at 21) which is a releasable pivotal point to be discussed later.

As will become apparent later, this four-pivotal-point linkage has unique construction and effects for achieving an increased freedom of design and advantageous aspects in the vehicle seat of this kind.

Now, with reference to FIGS. 1 to 8, a description will be made of a first embodiment of the vehicle seat 1 in accordance with the present invention, wherein the vehicle seat is equipped with a pair of known seat slide devices 2 and 2 for permitting forward and reward adjustment in position of the seat.

A seat cushion frame 6 and a seat back frame 7 are provided in the seat cushion SC and the seat back SB, respectively. The seat cushion frame 6 includes: a substantially-U-shaped front tubular frame portion 6a; and a pair of lateral frame portions 6b and 6b extending from two ends of that front tubular frame portion 6a, respectively. The seat back frame 7 includes: a substantially inverted-U-shaped upper tubular frame portion having a pair of lateral frame members 7a and 7a; and a pair of lower frame portions 7b and 7b.

As shown, each of the afore-said seat slide devices 2 and 2 comprises: a lower rail 2a which may be fixed on either a planar floor FL (see FIG. 4) or a first floor area F1 (see FIGS. 2 and 8); and an upper rail 2b slidably engaged with the lower rail 2a. Though not shown, a known lock mechanism is installed in those seat slide devices, so that operation of the lock mechanism causes locking and unlocking of the upper rails 2b with respect to the lower rails 2a for the purpose of locking the vehicle seat 1 at a desired position in the forward and rearward directions.

The two lower frame portions 7b and 7b of the seat back frame 7 are pivotally connected via two first pins 11 to the afore-said two upper rails 2a and 2b of the seat slide device 2, respectively. In other words, it is defined hereby that a pair of first pivotal points (at 11 and 11) are provided between the seat back frame 7 and the seat slide device 2 in a symmetrical manner relative to a center of the seat 1.

The two lateral frame portions 6b and 6b of the seat cushion frame 6 are pivotally connected via two second pins 12 to the two lower frame portions 7b and 7b of the seat back frame 7, respectively, at a location above the foregoing two first pins 11. In other words, it is defined hereby that a pair of second pivotal points (at 12 and 12) are provided between the seat cushion frame 6 and the seat back frame 7 in a symmetrical manner relative to a center of the seat 1.

Designation 16 denotes a load-receiving support element formed from a rigid tubular material in the illustrated substantially-U-shaped configuration. This load-receiving support member 16 is at its two lateral portions firmly welded to and along the respective two upper rails 2b and 2b of the seal slide device 2, and adapted to not only support the front leg element 10, but also receive and absorb a downward weight or load of an occupant on the seat 1 which will be applied downwards via the front leg element 10 to the load-receiving support member 16.

A pair of auxiliary support legs 25 and 25 are fixedly attached to a bottom side of the front cross portion 6a of the seat cushion frame 6 so as to be suspended from a forwardly-facing end portion of the seat cushion SC.

In accordance with the present invention, the front leg element 10 is provided between the seat cushion frame 6 and the load-receiving support member 16. The front leg element 10 is formed by bending a rigid tubular material in a substantially "V" shape or a substantially inverted-trapezoidal shape, as illustrated, which defines the following portions:

- a lower horizontal end portion 10c, which constitutes a male engagement portion to be releasably engaged in a female engagement portion 21 of a lock device 20, as will be explained later (hereinafter, the lower horizontal end portion 10c shall be referred to as "male engagement portion 10c"); and
- a pair of upper portions 10a and 10a, each having, defined therein, a rectilinear region 10a-1 terminating in a free end which forms an upper free end of the front leg member 10, and an inclined region 10a-2 which extends aslant downwardly from the rectilinear portion 10a-1 in a direction inwardly of the front leg element 10 and is integral with the lower horizontal end portion 10c.

Figure 3:
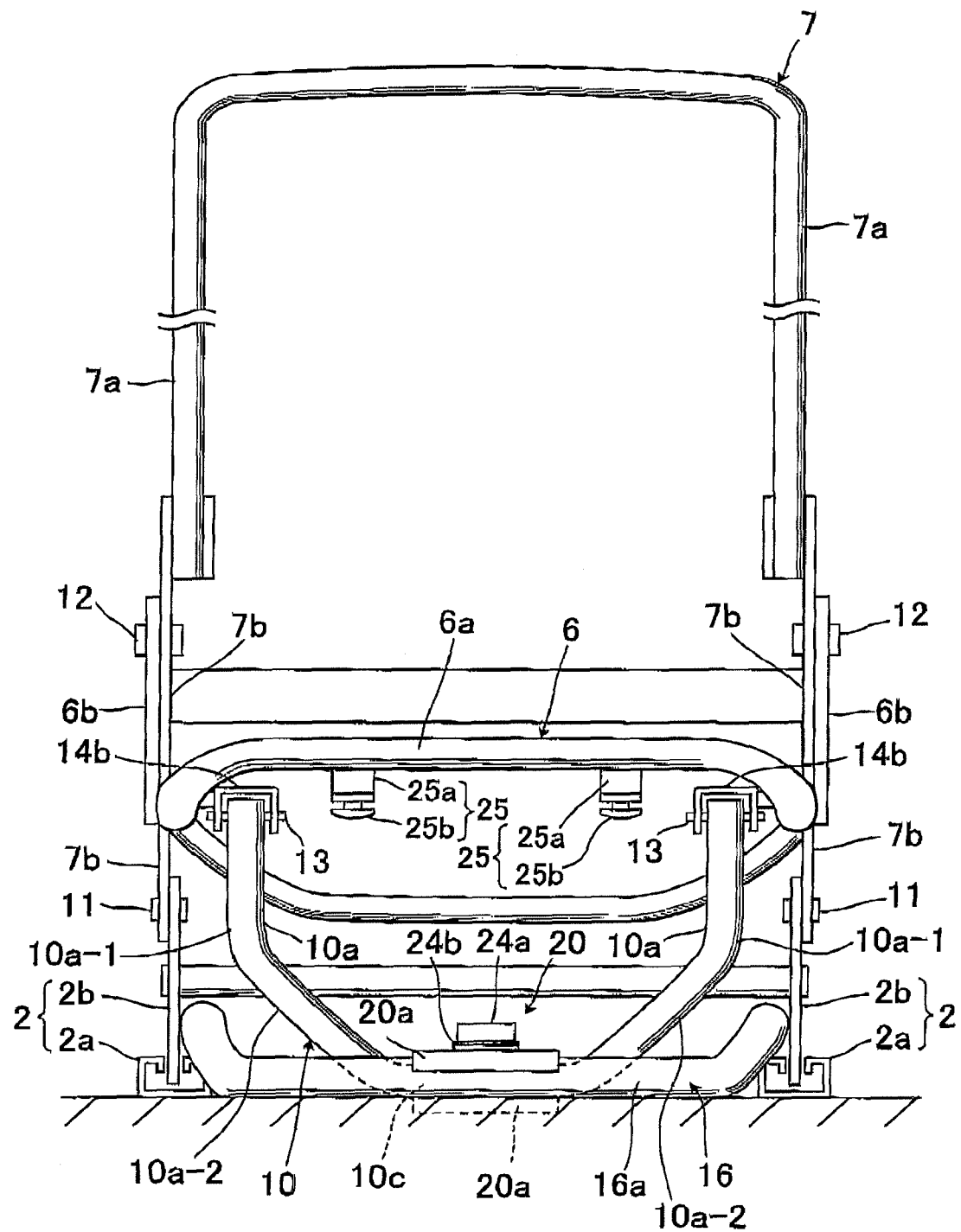
FIG. 3 is a front view of the first embodiment of vehicle seat framework.

Specifically, first and second connecting brackets 14a and 14b are firmly welded to the two lateral regions of the front tubular frame portion 6a of the seat cushion frame 6, respectively. As best shown in FIG. 3, one upper free end portion of the front leg element 10 is pivotally connected by a pin 13 to the first connecting bracket 14a, whereas the other upper free end of the front leg element 10 is pivotally connected by a pin 13 to the second connecting bracket 14b, so that the front leg element 10 is rotatably journalled between the two forward lateral regions of the seat cushion frame 6 in a manner suspended therefrom. Hence, the front leg element 10 is free to rotate swingingly relative to the pins 13 in forward and rearward directions under the seat cushion frame 6. In other words, it is defined hereby that a pair of third pivotal points (at 13 and 13) are provided between the front leg element 10 and the seat cushion frame 6 in a symmetrical manner relative to a center of the seat 1.

Figure 2:
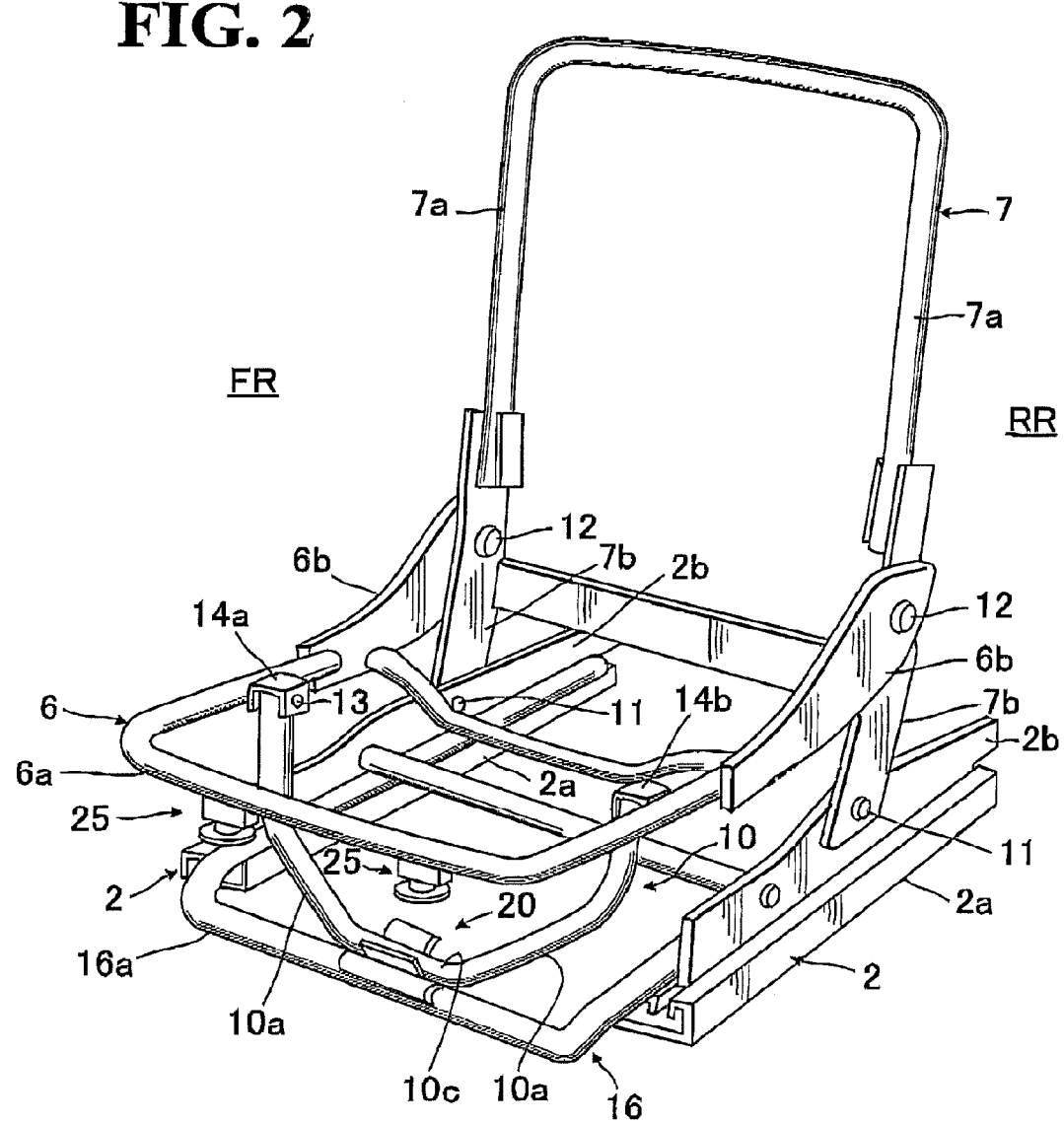
FIG. 2 is a perspective view showing a framework of vehicle seat in accordance with the first embodiment, wherein a seat slide device is provided.
Figure 6:
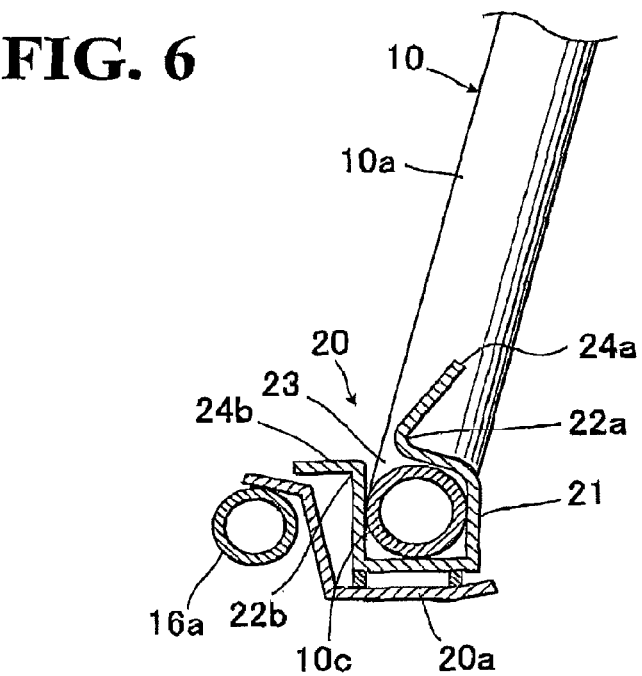
FIG. 6 is a fragmentary cross-sectional view of a principal part of the invention in accordance with the first embodiment, which shows a state where a male engagement portion of the front leg element is engaged in a lock device.

A lock device 20 is fixedly attached via a bracket 20a to mid area of a front cross portion 16a of the load-receiving support member 16. As can be seen in FIGS. 2 and 6, the lock device 20 includes a female engagement portion 21 into which a male engagement portion 10c of the front leg element 10 may be engaged and retained in a releasable manner. With this lock device 20, normally, the male engagement portion 10c is rotatably retained in the lock device 20, thereby being rotatably locked to the load-receiving support member 16 when the seat 1 is set in a normal use position shown in FIGS. 1 and 2. Thus, as far as the front leg element 10 is locked by the lock device 20 to the load-receiving support element 16, both two upper portions 10a and 10a of that front leg element 10 are free to rotate forwardly and rearwardly relative to a longitudinal axis of the male engagement portion 10c thereof rotatably engaged in the lock device 20. In other words, under such locked state, a fourth pivotal point (at 10c and 21) is provided between the front leg element 10 and the load-receiving support element 16.

As best shown in FIG. 6, for instance, the above-described lock device 20 may be formed from a leaf spring material in the illustrated clip-like configuration comprising:

- a female engagement portion 21 so configured to embracingly receive and accommodate the male engagement portion 10c of the front leg element 10 so as to permit rotation of the latter 10c therein;
- a pair of spaced-apart first and second guide pieces 24a and 24b upturned from the female engagement portion 21 in a direction away from each other;
- a first inwardly-curved region 22a defined between the first guide piece 24a and the female engagement portion 21;
- a second inwardly-curved region 22b defined between the second guide piece 24b and the female engagement portion 21; and
- an opening 23 defined between the first and second inwardly-curved regions 22a and 22b, wherein such opening 23 is adapted for allowing ingress and egress therethrough of the afore-said male engagement portion 10c into and from the female engagement portion 21.

Here, the first and second inwardly-curved regions 22a and 22b project inwardly toward each other, but are spaced apart from each other, thereby forming a narrow area between the female engagement portion 21 and the two guide pieces 24a, 24b, as shown. In such narrow area, the opening 23 is defined. With this constricted or narrow configuration, the male engagement portion 10c of the front leg element 10, received in the female engagement portion 21, is normally blocked and prevented by the two inwardly-curved regions 22a and 22b from being removed from the lack device 20.

The female engagement portion 21 is of a substantially channel cross-section as viewed from FIG. 6 in which the lower horizontal portion or male engagement portion 10c of the front leg element 10 may be rotatably accommodated. As will be elaborated later, the front leg element's male engagement portion 10c can be engaged and disengaged in and from the lock device's female engagement portion 21 at the time when a user executes an operation for folding both seat back SB and seat cushion SC downwardly onto either the planar floor FL (see FIG. 4) or the lower floor area F2 (see FIG. 8), or executes a seat cushion tip-up operation for folding the seat cushion SC upwardly towards the seat back SB.

Figure 7:
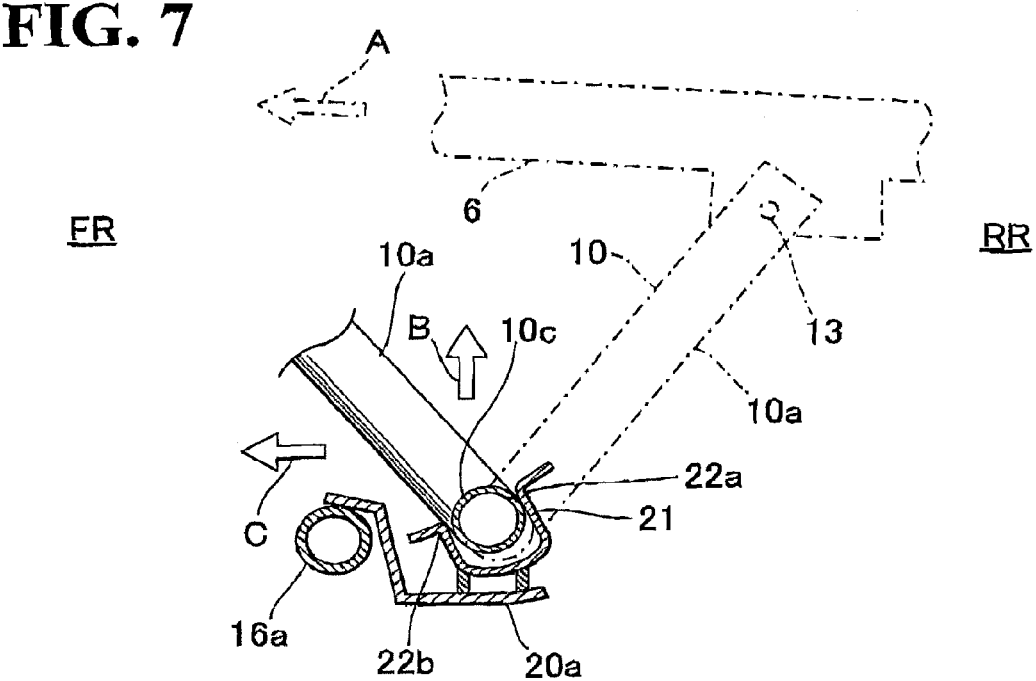
FIG. 7 is a fragmentary cross-sectional view of the principal part of the invention in accordance with the first embodiment, which explanatorily shows a state where the male engagement portion is about to be disengaged from the lock device.

As understandable from FIGS. 6 and 7, the opening 23 is oriented to the forward side FR in an upwardly angular relation with the female engagement portion 21 so as to be, located at a locus along which the male engagement portion 10c of the front leg element 10 is to be displaced away from the female engagement portion 21, which will be specifically described later. In this regard, the male engagement portion 10c, received in the female engagement portion 21, is enclosed by four walls of the latter 21, excepting the opening 23. Thus, even when a normal upward force is applied, attempting to pull the male engagement portion 10c in an upward direction substantially perpendicular to the lock device 20, the male engagement portion 10c is positively blocked by an upper horizontal wall of the female engagement portion 21 against removal from the lock device.

In brief, to disengage the male engagement portion 10c from the lock device 20, as will be specified later, a user should simply fold the seat back SB downwardly to cause the male engagement portion 10c to disengage from the female engagement portion 21 against the resilient repulsive forces of the first and second inwardly-curved regions 22a and 22b, so that the female engagement portion 10c may pass through therebetween to the outside of the lock device 20, thereby cancelling the afore-said fourth pivotal point and destroying the four-pivotal-point linkage. Conversely, to engage the male engagement portion 10c with the lock device 20, a user should first place that male engagement portion 10c upon the first and second guide pieces 24a and 24b of the lock device 20, and forcibly pass the same 10c through between those two guide pieces 24a and 24b into the inside of the female engagement portion 21, whereupon the fourth pivotal point is established by those male and female engagement portions 10c and 21.

With the above-described arrangement, insofar as the male engagement portion 10c of the front leg element 10 is engaged in the lock device' male engagement portion 21, all the first pivotal point at 11, second pivotal point at 12, third pivotal point at 13, and fourth pivotal point at 10c and 21 are maintained in the vehicle seat 1, which establishes a four-pivotal-point linkage among the seat back SB, seat cushion SC, front leg element 10 and seat slide device 2. Thus, insofar as such linkage is maintained, a user can move the seat back SB forwardly and rearwardly within a limited range to cause simultaneous forward and rearward rotation of both front leg element 10 and seat cushion SC relative to the lock device 20.

Figure 4:
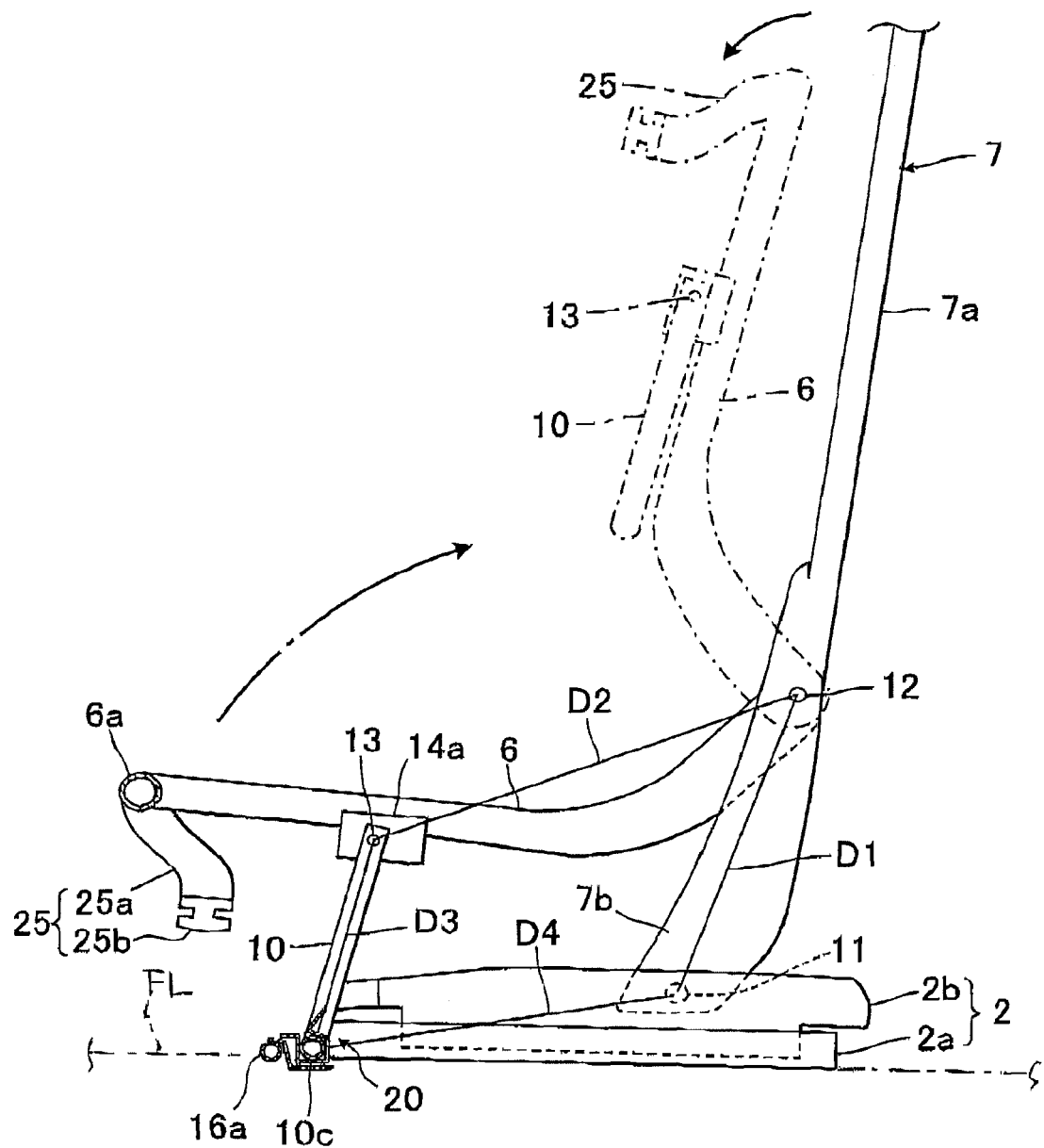
FIG. 4 is a side elevation view of the vehicle seat framework, which shows a linkage relation among four pivotal points provided therein.

In this regard, with reference to FIG. 4, the four-pivotal-point linkage can be observed imaginarily by the four solid lines which are designated by D1, D2, D3 and D4, respectively, wherein the designation D1 represents a first distance between the first pivotal point (at 11) and the second pivotal point (at 12);

the designation D2 represents a second distance between the second pivotal point (at 12) and the third pivotal point (at 13);

the designation D3 represents a third distance between the third pivotal point (at 13) and the fourth pivotal point (at 10c and 21); and the designation D4 represents a fourth distance between the fourth pivotal point (at 10c and 21) and the first pivotal point (at 11).

In accordance with the present invention, the following conditions are set:

A sum of the first and second distances D1 and D2 is not equal to and not smaller than a sum of the third and fourth distances D3 and D4, as expressed by the following inequality: D1+D2>D3+D4

The second distance D2 is not smaller than the fourth distance D4, as expressed by the following inequality: D2>D4

Because of the inequality D1+D2>D3+D4, a diagonal distance between the second pivotal point (at 12) and the fourth pivotal point (at 10c and 21) is greater than a diagonal distance between the first pivotal point (at 11) and the third pivotal point (at 13), as can be seen in FIG. 4. With forward-and-downward folding of the seat back frame 7, the former diagonal distance between the second and fourth pivotal points (at 12) and (at 10c and 21) becomes smaller than the distance D2, while that distance D2 remains unchanged, within the four-pivotal-point linkage This greatly increases an upward displacement of the third pivotal point (at 13) from the fourth pivotal point (at 10c and 21), so that, upon the seat back frame 7 being folded by an angle of inclination exceeding a predetermined angle, the male engagement portion 10c of the front leg element 10 is forcibly pulled upwards and disengaged from the lock device's female engagement portion 21.

Only the fourth pivotal point (at 10c and 21) may be cancelled, since the male engagement portion 10c is releasable from the lock device's female engagement portion 21 as stated above, to thereby permit destroying the four-pivotal-point linkage in the seat 1.

Accordingly, the four-pivotal-point linkage in the present invention is arranged irregularly in contrast to the parallel linkage relation maintained in the conventional seats.

First of all, as briefly stated above, a primary aspect of the present invention is to provide an increased freedom of design for this sort of vehicle seat. For that purpose, inventors of the present invention have come up with the above-described unique linkage in the vehicle seat 1 to increase freedom of setting the front leg element 10 to the seat cushion frame 6.

Hereinafter, a description in this regard will be given specifically with reference to FIGS. 4 to 8, by way of one example, based on the above-defined four conditions.

Figure 5:
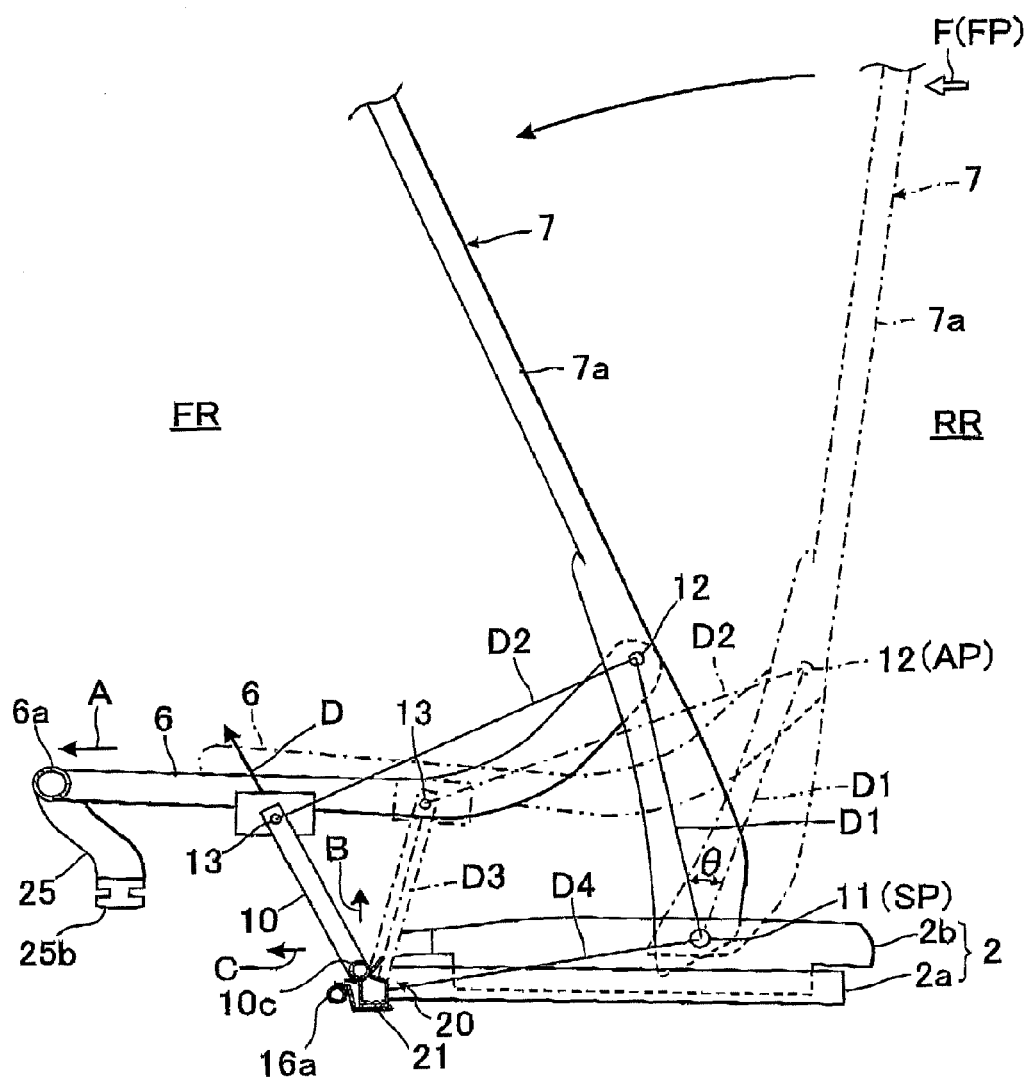
FIG. 5 is a diagram for explanatorily showing a state where a front leg element is released from a fourth pivotal point, thereby destroying the linkage relation, when a seat back frame is inclined and moved downwardly by an angle exceeding a predetermined angle.

Suppose now that the seat back frame 7 is folded forwardly and downwardly under a force F applied from a user and that the inclination angle of the seat back frame 7 exceeds a predetermined angle θ, as shown in FIG. 5. Then, under the above-described unique linkage, the seat cushion frame 6 is first subjected to extreme forward-and-upward displacement. In other words, the third pivotal point at 13 in the seat cushion frame 6 is moved forwardly beyond the fourth pivotal point (at 10c and 21) due to the inequality D2>D4, with a forward component C being generated from the force F. At the same time, while not clearly shown, it can be seen from FIG. 5 that, as the diagonal distance between the second and fourth pivotal point (at 12) and (at 10c and 21) becomes smaller than the distance D2, while that distance D2 remains unchanged, within the four-pivotal-point linkage. This action causes the second pivotal point at 12 to displace downwardly toward and approach the fourth pivotal point at 10c and 21, which in turn causes upward displacement of a forward portion of the seat cushion frame 6 corresponding to the third pivotal point at 13. In this regard, the diagonal distance between the second and fourth pivotal points (at 12) and (at 10c and 21) is greater than the diagonal distance between the first and third pivotal points (11) and (13), which means that the diagonal distance between the second and fourth pivotal points is particularly much greater than a corresponding diagonal distance in the conventional four-pivotal-point linkage. Accordingly, in the present invention, the upward displacement of the third pivotal point at 13 is greatly increased as compared with the conventional four-pivotal-point linkage, whereby the third pivotal point at 13 is moved far upwardly away from the fourth pivotal point at 10c and 21, with concurrent forward movement of the seat cushion frame 6. Thus, an upward component B is generated from the force F. With those actions, the male engagement portion 10c is forcibly pulled forwardly and upwardly from the female engagement portion 21, and under the upward and forward components B and C, the male engagement portion 10c is moved in the direction of arrow D and pressed against both first and second inwardly-curved regions 24a and 24b, which in turn causes those two regions 24a and 24b to resiliently warp away from each other, thereby widening the opening 23, as best seen in FIG. 7. As such, the male engagement portion 10c enters the widened opening 23 and passes through between the two inwardly-curved regions 24a and 24b to the outside of the lock device 20, as understandable in FIG. 5.

In this regard, what is most important aspect is that the front leg element 10 is releasable from the lock device 20 situated at the fourth pivotal points (at 10c and 21) and displaceable in any of horizontal and vertical directions with respect to either the planar floor FL or the second floor area F2. In other word, the front leg element 10 is a point that maintains the four-pivotal-point linkage, which adversely restricts the design and actions of the seat 1 as understandable from the preceding description of prior art, and if the front leg element 10 is releasable from the fourth pivotal point at 10c and 21, the four-pivotal-point linkage will be destroyed and nullified, so that any of the front leg element 10, seat cushion frame 6 and second floor area F2 can be designed and set in various dimensions and configurations to a greater extent than the conventional fixed-pivotal-point articulation mechanism or parallel linkage mechanism stated in the description of prior art. Therefore, in the present invention, the male engagement portion 10c of the front leg element 10 is releasable from the female engagement portion 21 of the lock device, thereby permitting the four-pivotal-point linkage to be destroyed.

Figure 9:
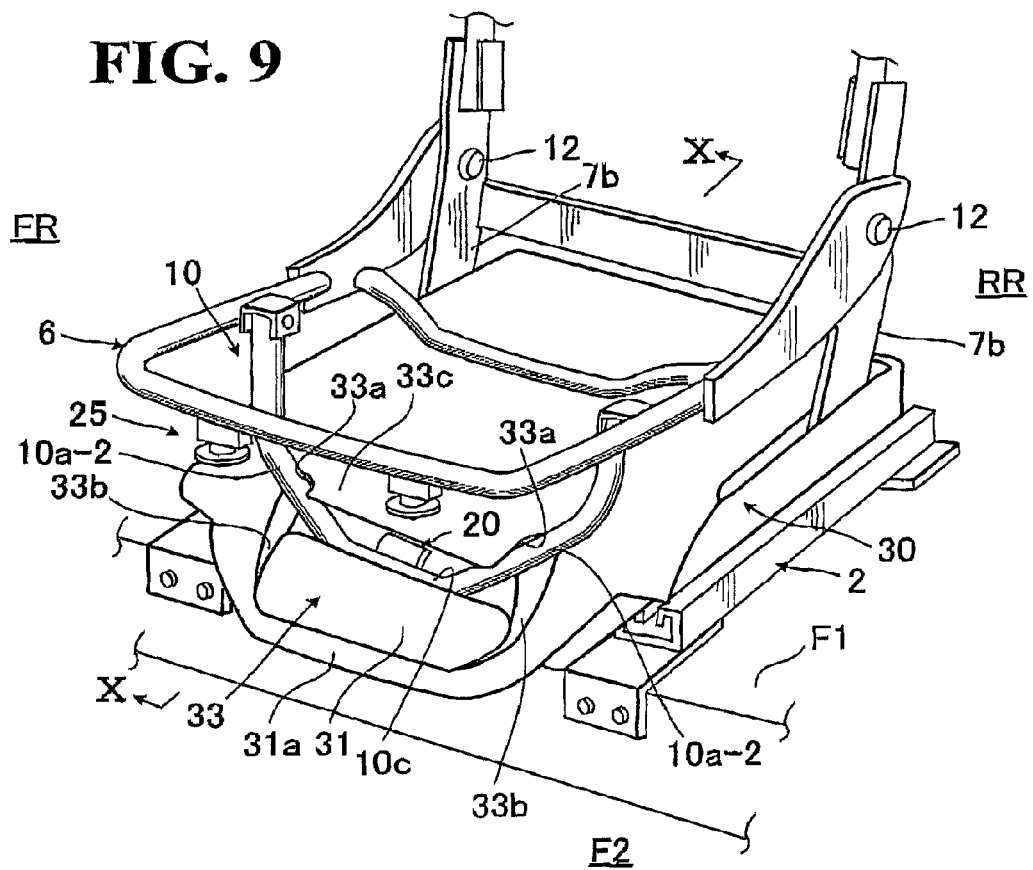
FIG. 9 is a partly broken schematic perspective view showing a second embodiment of the present invention, wherein an under cover is provided between the seat cushion frame and seat slide device.
Figure 13:
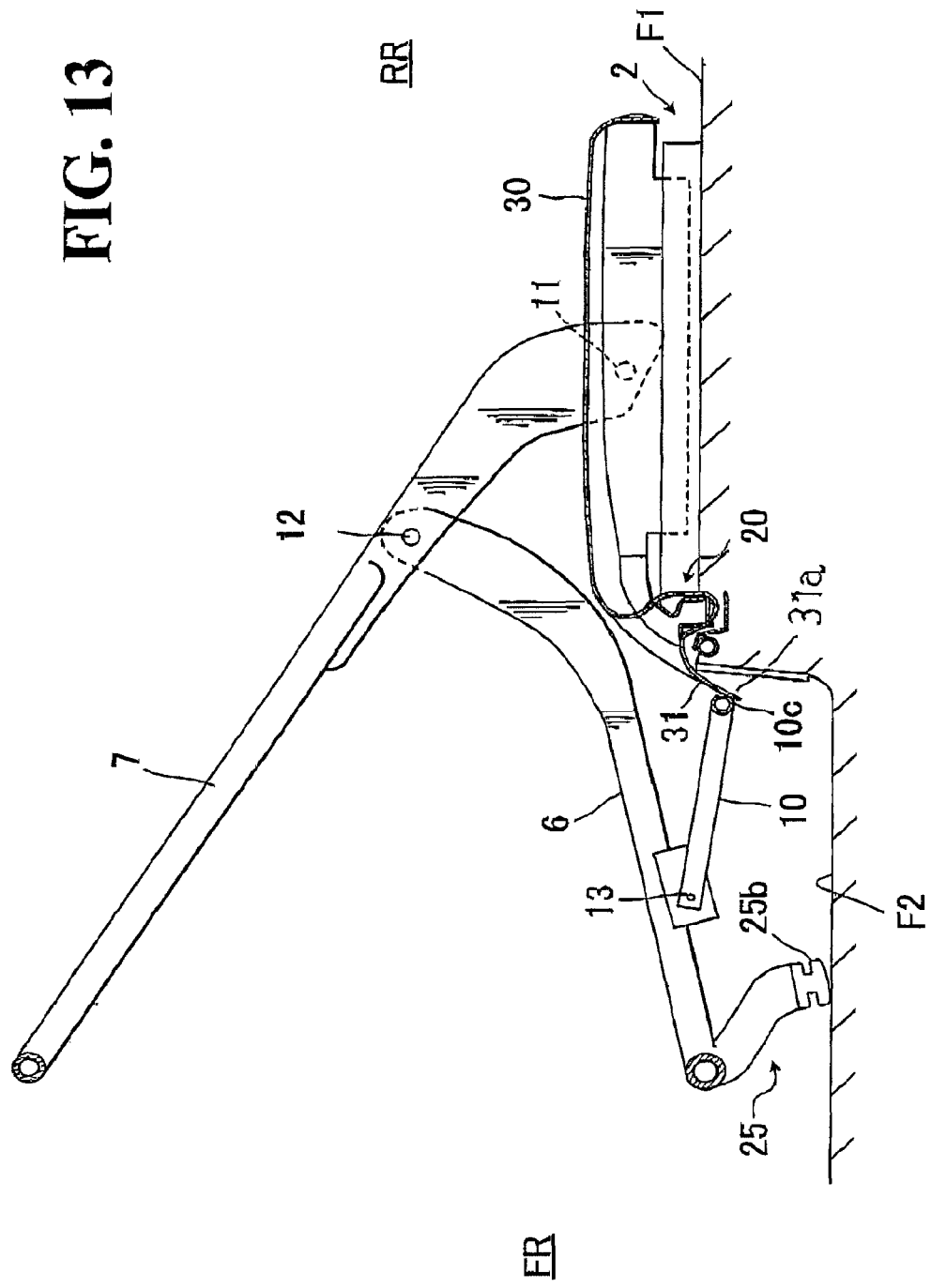
FIG. 13 is a diagram showing a state where a front end portion of the seat cushion frame comes into contact on the second floor area, while the male engagement portion is still moved on the lower end region of the under cover, in accordance with the second embodiment.
Figure 14:
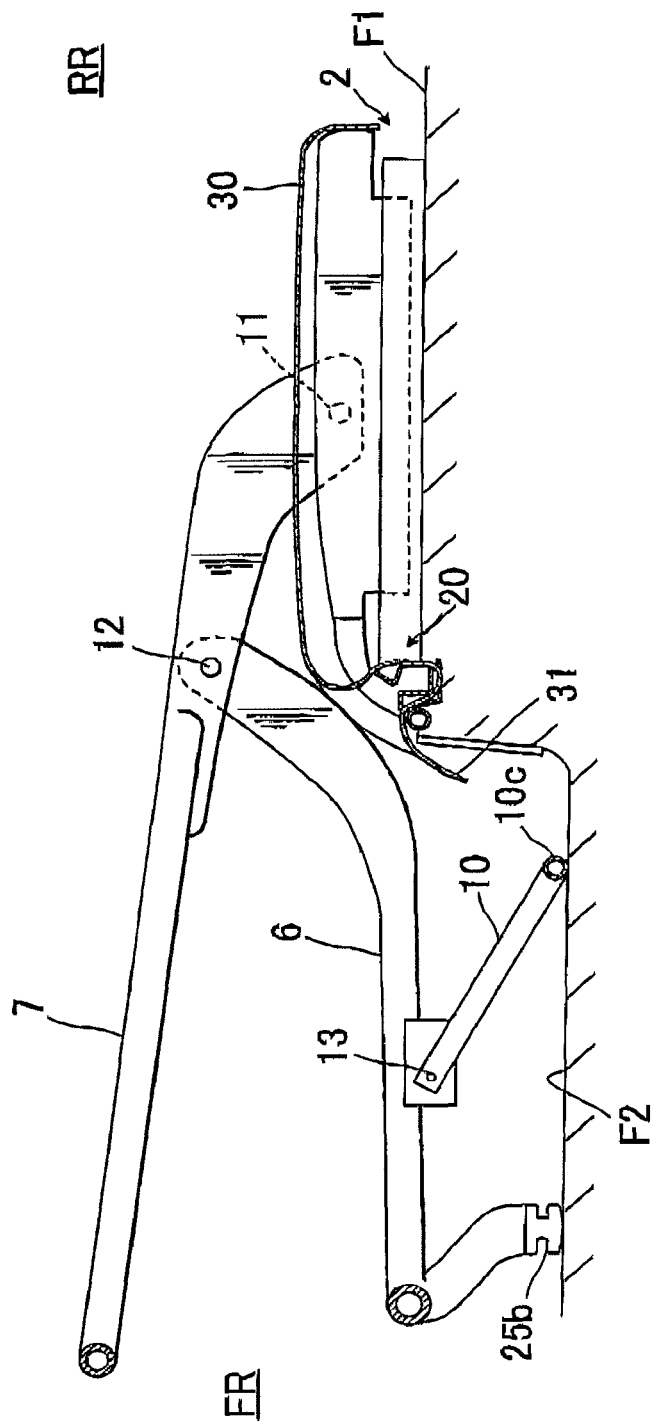
FIG. 14 is a diagram showing a state where both seat cushion frame and seat back frame folded thereon are stored at the second floor area, in accordance with the second embodiment.

With such arrangement, for example, the following effects are attainable, on the understanding that the front leg element 10, with its male engagement portion 10c engaged in the lock device' female engagement portion 21, has a rigidity for withstanding a maximum tolerable load to be applied thereto.

i) In designing the front leg element 10, the upper end (at 13) thereof can be set at a desired position in the seat cushion frame 6 in relation to the lock device 20, and also, a length of the front leg element 10 be set in correspondence therewith, as desired, on the condition that D1+D2>D3+D4.

ii) As indicated by one-dot line in FIG. 4, where one planar floor FL of vehicle is provided, it is possible to design and form the front leg element 10, seat back frame 7 and seat cushion frame 6, in desired size and shape, based on the condition given in the item i) above, so as to not only permit folding of the seat back SB down onto the seat cushion SC, but also permit displacement of the seat cushion SC with the seat back SB folded thereon in the forward-and-downward direction to a predetermined storage area on the planar floor FL.

iii) As shown in FIGS. 2 and 9, where a first floor area F1 and a second floor area F2 are provided, wherein the second floor area F2 is low relative to the first floor area F1, it is also possible to design and form the front leg element 10, seat back frame 7 and seat cushion frame, in desired size and shape, based on the condition given in the item above, so as to not only permit folding of the seat back SB down onto the seat cushion SC, but also permit displacement of the seat cushion SC with the seat back SB folded thereon in the forward-and-downward direction to the second floor area F2 (see FIGS. 5, 13 and 14 for example). Further, the second floor area F2 may be formed deep or shallow (or may be set in height), as desired, with respect to the first floor area F1, insofar as the former F2 is not higher than the latter F1, and also, in corresponding therewith, a length of the front leg element 10 be set, as desired, on the condition that D1+D2>D3+D4.

iv) With regard to the item iii) above, both front leg element 10 and second floor area F2 may be designed and set in any size and shape, according to size and shape of the seat cushion frame 6 or seat cushion SB.

v) There is no need to move the seat cushion SC via the seat slide device 2 to permit folding of the seat back SB onto the seat cushion, as in the conventional seat. This is because, in the present invention, the fourth pivotal point at 10c and 21 can be cancelled by releasing the front leg element 10 from the lock device 20, which allows the seat back SB to be completely folded down onto the seat cushion SC, irrespective of the upper rail 2b being locked to the lower rail 2a at any position. Therefore, in contrast to the conventional vehicle seats, the seat slide device or any other kind of forward-and-rearward adjustment device provided to the vehicle seat 1 do not restrict the movement of the seat back SB.

In this context, the pair of the auxiliary support legs 25 and 25 each comprises: a downwardly extending portion 25a which is at its upper end fixed to the seat cushion frame 6; and a contact portion 25b fixedly provided to a lower end of that downwardly extending portion 25a. Those two auxiliary support legs 25 and 25 are disposed in the seat cushion SC, such that both two contact portions 25b projects downwardly from the underside of the seat cushion SC, as seen in FIG. 1. In the process of folding and displacing both seat cushion frame 6 and seat back frame 7 to either a predetermined storage area in the planar floor FL or the second floor area F2, the two contact portions 25b and 25b respective of the two auxiliary support legs 25 and 26 are first brought into contact with either the planar floor FL or the second floor area F2, as understandable from FIG. 17, thereby avoiding any damage and injury to the outer forward surfaces of the seat cushion SC and also preventing the seat cushion SC from being stained by dirt and dust on either the planar floor FL or the second floor area F2.

In addition to the above-described main aspect of the present invention, other remarkable aspects of the invention will be set forth as below.

a) As can be seen from FIG. 5 in conjunction with FIG. 4, as far as the sea back frame 7 is rotated forwardly and downwardly relative to the first pivotal point (at 11) by an angle of inclination which is not greater than the predetermined angle θ, the front leg element 10 as well as its upper pivotal point (at 13) may be rotatively displaced forwardly relative to the longitudinal axis of the male engagement portion 10c rotatably engaged in the female engagement portion 21. Under such condition only, a four-pivotal-point linkage (at D1, D2, D3 and D4) is maintained among the seat back frame 7, seat cushion frame 6, front leg element 10 and seat slide device 2, so that the male engagement portion 10c is maintained in engagement with the lock device 20, thus keeping the front leg element 10 in a locked relation with the load-receiving support element 16. In other words, a certain play is given to the forward and rearward movements of both seat cushion SC and seat back SB, prior to a user completely folding down the seat back SB onto the seat cushion SC for displacement thereof to either a predetermined storage area in the planar floor FL or the second floor area F2.

b) Now, suppose that the seat back frame 7 is folded forwardly and downwardly by an angle of inclination exceeding the predetermined angle θ, as shown in FIG. 5. In that case, clue to the linkage discussed above and also due to a leverage aspect of the seat back frame 7 to be explained later, forward and upward forces are applied to the seat cushion frame 6 in a greatly amplified manner.

In brief, as indicated in FIG. 5, a forward-and-downward force F applied by a user from the seat back frame 7 is transmitted through the linkage (at D1, D2, D3 and D4) towards the front leg element 10 and transformed into a forward-and-upward force having a forward component C and an upward component B, such that the forward component C attempts to displace the third pivotal point (at 13) far forwardly beyond the fourth pivotal point (at 10c and 21) where the lock device 20 lies, while at the same time, the upward component B attempts to displace that third pivotal point (at 13) far upwardly from the fourth pivotal point (at 10c and 21).

More specifically, with forward and downward folding of the seat back frame 7 by an angle exceeding the predetermined angle θ under the force F, the seat cushion frame 6 is subjected to extreme forward-and-upward displacement through the above-described unique linkage, to the extent that: i) the third pivotal point at 13 in the seat cushion frame 6 is brought onward past the fourth pivotal point at 10c and 21 due to the inequality D2>D4, with the forward component C being generated from the force F, and ii) at the same time, the diagonal distance between the second and the fourth pivotal points (at 12) and (at 10c and 21) becomes smaller than the distance D2, while that distance D2 remains unchanged, within the four-pivotal-point linkage, with the result that the third pivotal point (at 13) is moved in upward direction away from the fourth pivotal point (at 10c and 21), with the upward component B being generated from the force F.

As a consequence thereof, the male engagement portion 10c is forcibly pulled forwardly and upwardly from the female engagement portion 21 by a certain angle relative to a bottom of the latter 21. Here, a locus exists, along which the male engagement portion 10c is to be displaced away from the female engagement portion 21 in the forward and upward directions. As stated previously, the opening 23 of the lock device 20 is situated at such locus, for which any person skilled in the art can understand by looking at FIGS. 5, 6 and 7. Therefore, under the upward and forward components B and C, the male engagement portion 10c is moved along the said locus in the direction of arrow D and precisely pressed against both first and second inwardly-curved regions 22a and 22b, whereupon those two regions 22a and 22b are resiliently warped away from each other by that male engagement portion 10, against their biasing forces, thereby widening the opening 23, as best seen in FIG. 7. Consequently, the male engagement portion 10c smoothly enters the widened opening 23 and passes through between the two inwardly-curved regions 22a and 22b to the outside of the lock device 20, as seen in FIG. 5.

c) in connection with the item b) above, it is importantly added that the force F applied to the seat back frame 7 is amplified by a leverage provided among the seat back frame 7, seat cushion frame 6 and seat slide device 2, and the amplified force will be transmitted through the four-pivotal-point linkage towards the male engagement portion 10c. Referring to FIG. 5, such leverage will be described. When a user pushes and moves a top portion of the seat back SB or a top portion of the seat back frame 7 forwardly and downwardly, a particular point in that seat cushion frame's top portion, pushed by the user, forms a point of force application FP. A distance between the top portion of the seat cushion frame 7 and the second pivotal point 12 is over twice or three time as great as a distance between the second pivotal point 12 and the first pivotal point 11. Therefore, as the user folds the seat back frame 7 from the point at FP forwardly and downwardly relative to the first pivot point 11 forming a fulcrum SP, a degree of the force F is amplified in relation to that fulcrum SP and exerted upon the second pivotal point 12 under the effect of leverage, whereupon that second pivotal point 12 forms a point of action AP against the third pivotal point 13. Namely, the amplified force is transmitted from the second pivotal point 12 (i.e. the point of action AP) directly to the third pivotal point 13 to which the upper end of the front leg element 10 is pivotally connected, thereby attempting to cause that upper end of the front leg element 10 as well as the front leg element 10 proper to move forwardly and upwardly in the direction of arrow D. At this point, due to the above-discussed linkage, the thus-amplified forward-and-upward force therefore has the upward and forward components B and C sufficient to overcome the biasing force of the two inwardly-curved regions 22a and 22b of the lock device 20. Accordingly, by applying a relatively small force to the seat back SB, a user can smoothly cause the male engagement portion 10c to pass through between the two inwardly-curved regions 22a and 22b and disengage from the male engagement portion 21 of the lock device 20.

By the virtue of the above-described arrangements in the seat 1, when it is desired to fold and move both seat cushion SC and seat back SB to either a predetermined area in the planar floor FL or the lower floor area F2, a user may simply fold the seat back SB or the seat back frame 7 forwardly and downwardly relative to the first pivotal point 11, whereby the seat cushion SC or the seat cushion frame 6 is displaced forwardly and downwardly, with the front leg element 10 being rotated forwardly relative to the fourth pivotal point at 10c and 21.

At this point of time, in the case of the planar floor FL, with further forward-and-forward folding of the seat back frame 7, it is to be understood, thought not shown, that the front end portion of the seat cushion frame 6 or the two auxiliary support legs 25 and 25 are first brought into contact on the planar floor FL before the forward inclination angle of the seat back frame 7 reaches the predetermined angle θ, while the male engagement portion 10c of the front leg element 10 is being rotated within the female engagement portion 21 of the lock device 20. Thus, during this stage, the front leg element is maintained in engagement with the lock device 20. Subsequent to the auxiliary support legs 25 having contacted the floor FL, when the seat back frame 7 is further rotated by an angle exceeding the predetermined angle θ, the male engagement portion 10c of the front leg element 10 passes through between the first and second inwardly-curved regions 22a and 22b against the biasing forces of the latter and is automatically disengaged from the female engagement portion 21. This can be understood from FIGS. 5 and 7. With the forward-and-downward movement of the seat back frame 7, the male engagement portion 10c rides on and past both second guide pieces 24b and front cross portion 16a of the load-receiving support element 16, though not shown. After then, both auxiliary support legs 25 and male engagement portion 10c are slidingly moved on the planar floor FL in the forward direction and stopped at the time when the seat back frame 7 has been completely folded to a fold-down position where it extends adjacent to the seat cushion frame 6 in a substantially parallel relation therewith. Thus, it is to be understood that both seat cushion SC and seat back SB folded thereon are placed at a predetermined storage area in the planar floor FL, whereby a space behind the vehicle seat 1 is widened and the rear surface of the seat back SB may be used as a loading or baggage-loading area in a vehicle or automobile.

Figure 8:
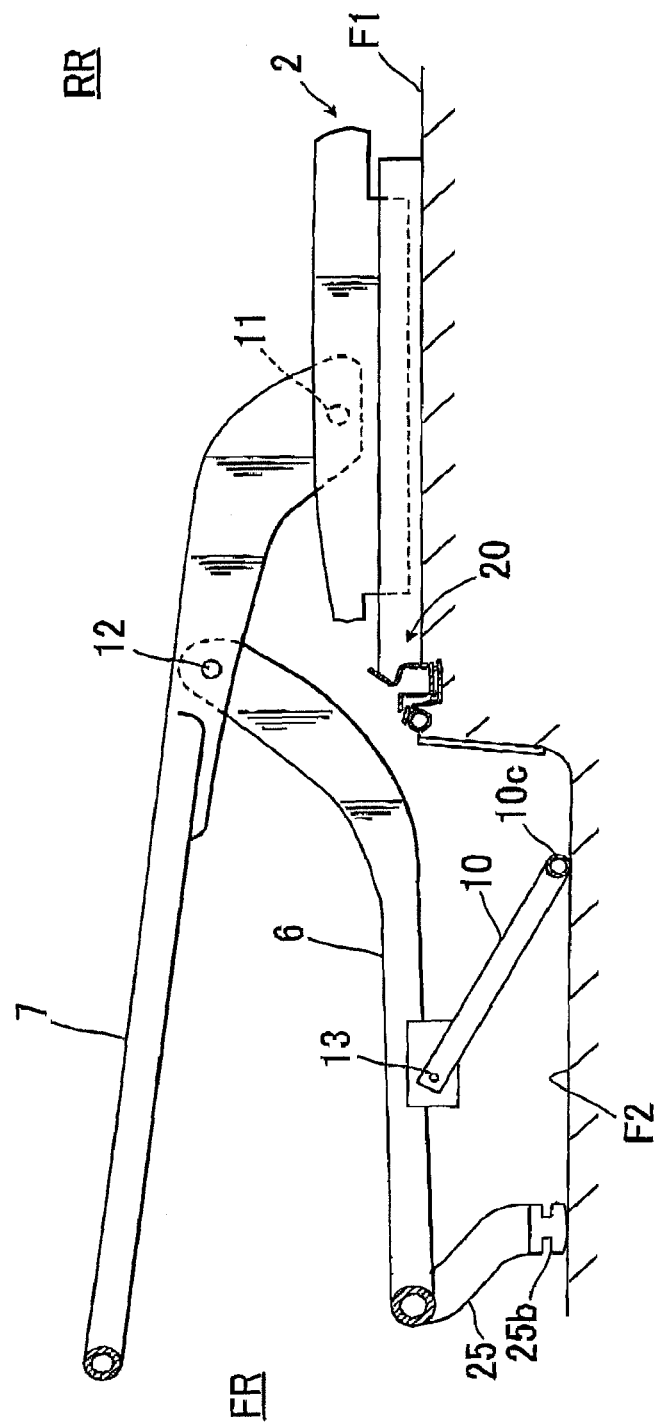
FIG. 8 is a diagram showing a state where both seat cushion frame and seat back frame folded thereon are stored at a second floor area, in accordance with the first embodiment.
Figure 17:
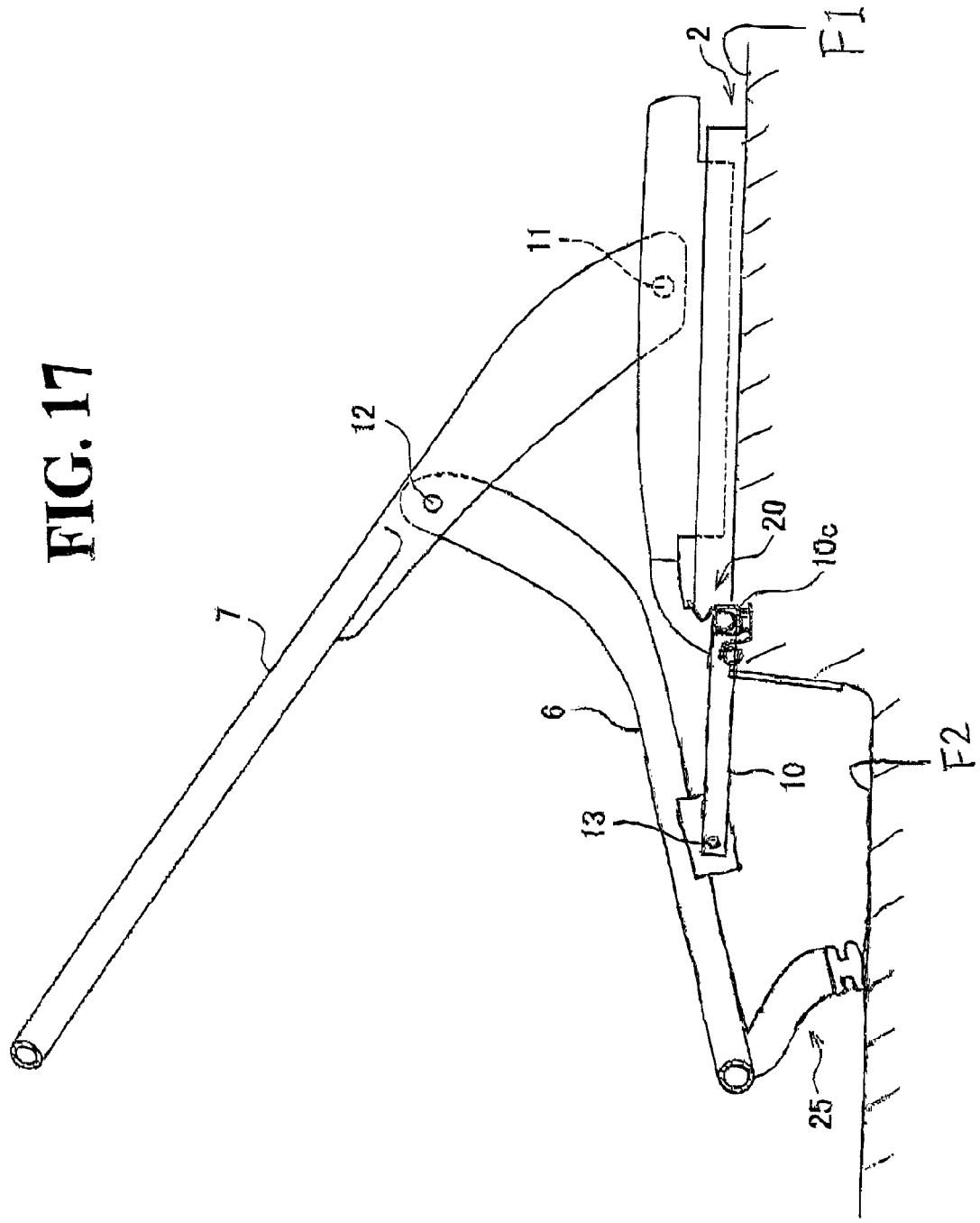
FIG. 17 is a diagram showing a state where an auxiliary support element of the seat cushion frame is first contacted on a second floor area, while the male engagement portion is still being engaged in the lock device.

On the other hand, in the case of the first and second floor areas F1 and F2, referring to FIGS. 17 and 8 in sequence, the front end portion of the seat cushion frame 6 or the two auxiliary support legs 25 and 25 are first brought into contact on the second floor area F2 before the forward inclination angle of the seat back frame 7 reaches the predetermined angle θ, while the male engagement portion 10c is being rotated within the female engagement portion 21. Thus, during this stage, the front leg element is maintained in engagement with the lock device 20. Subsequent to the auxiliary support legs 25 having contacted the second floor area F2, when the seat back frame 7 is further rotated by an angle exceeding the predetermined angle θ, the male engagement portion 10c passes through between the first and second inwardly-curved regions 22a and 22b against the biasing forces of the latter and is automatically disengaged from the female engagement portion 21. This can be understood from FIGS. 5 and 7. With further forward-and-downward movement of the seat back frame 7, the male engagement portion 10c is fallen from the first floor area F1 to the second floor area F2 and contacted on that particular second floor area F2. Then, both auxiliary support legs 25 and male engagement portion 10c are slidingly moved on the second floor area F2 in the forward direction and stopped at the time when the seat back frame 7 has been completely folded to a fold-down position where it extends adjacent to the seat cushion frame 6 in a substantially parallel relation therewith, as seen in FIG. 8. Accordingly, both seat cushion SC and seat back SB folded thereon are stored at the second floor area F2, thereby permitting the rear surface of the seat back SB to be used as a loading or baggage-loading area in a vehicle or automobile.

Also, when effecting a seat cushion tip-up operation for folding the seat cushion SC or seat cushion frame 6 upwardly to a front side of the seat back SB or seat back frame 7, a user may simply fold the seat back SB or seat back frame 7 downwardly until the male engagement portion 10c of the front leg element 10 is disengaged from the female engagement portion 21 of the lock device 20, which is of course based on the above-described linkage and leverage. Thereby, the seat cushion SC or seat cushion frame 7 can be unlocked from the lock device 20 and be free to rotate vertically relative to the second pivotal point at 12. When the user ascertains that the male engagement portion 10c has been disengaged from the lock device 20, he or she should stop folding down the seat back frame 7 and reversely rotate the same 7 back to the upright home position thereof. After then, the user should raise the thus-unlocked seat cushion frame 6 towards the seat back frame 7 relative to the second pivotal point at 12, so that the seat cushion frame 6 is positioned on the front side of the seat back frame 7, as indicated by the one-dot chain lines in FIG. 4. Here, the front leg element 10 is in the state of being suspended from the third pivotal point at 13 and rested on a bottom side of such upwardly-folded seat cushion frame 6 or seat cushion SB. Accordingly, the front leg element 10 does not protrude from the seat cushion SB, whereby a space is fully given in front of the thus-folded seat cushion SB and can be used for versatile purposes. In this regard, a suitable lock device may be provided to the seat back SB for the purpose of locking the front leg element 10 to the side of the seat back SB. It is therefore appreciated that the seat cushion tip-up operation can also be easily effected under the actions of the unique linkage of the present invention.

In this context, as stated previously, the leverage is worked by: the seat back's top portion (at F) forming a point of force application FP; the first pivot point (at 11) forming a fulcrum SP; and the second pivotal point (at 12) forming a point of action AP. But, in addition to such leverage, another second leverage may be provided to the front leg element 10 by simply defining a fulcrum on the side of first floor area F1, the fulcrum being a point with which the two inclined regions 10a-2 and 10a-2 of the front leg element 10 are to be contacted when folding down the seat back SB towards the seat cushion SC. For example, although not shown, a pair of upwardly-protruding or raised portions may be formed in the front cross portion 16a of the load-receiving support element 16 at points corresponding to the two inclined regions 10a-2 and 10a-2.

Figure 12:
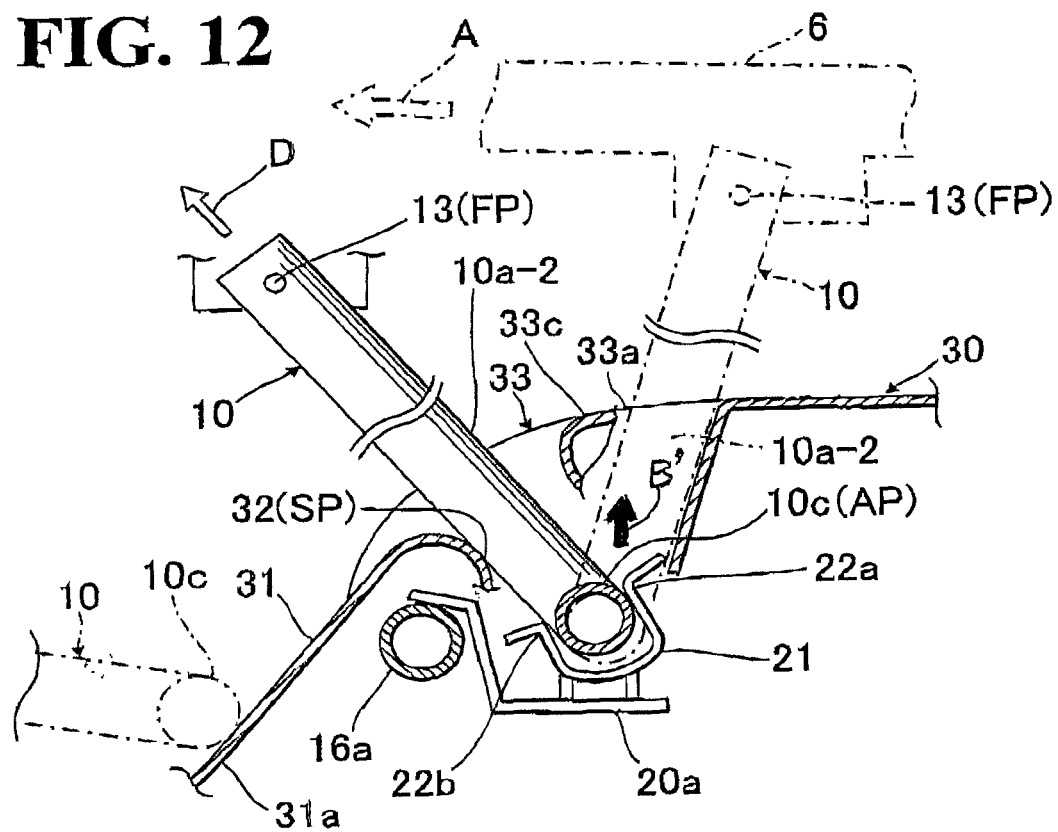
FIG. 12 is a fragmentary cross-sectional view of the principal part of the invention in accordance with the second embodiment, which explanatorily shows a state where the male engagement portion is disengaged from the lock device and moved on a guide surface region of the under cover.

In this connection, reference is made to a second embodiment of FIGS. 9 and 12 which shows one example of the afore-stated second leverage that can be realized at the front leg element 10. This will be described specifically later. In brief, according to this second embodiment, the fulcrum SP is defined at a cumbered top portion 32 of an under cover 30 provided to the vehicle seat 1. But, it is to be noted that the second leverage using the unshown raised portions stated above is identical in structure and actions to the second leverage shown in FIG. 12, only excepting a position of the fulcrum SP. Therefore, while not clearly shown, but with reference to FIG. 12, the mode of second leverage using the unshown raised portions will be described as follows. Namely, looking at the FIG. 12, let us define that each of the unshown two raised portions defined in the front cross portion 16a of the load-receiving support element 16 forms a fulcrum SP with respect to the corresponding one of the two inclined regions 10a-2 and 10a-2 of the front leg element 10, that the third pivotal point 13 at each of the two upper ends of the front leg element 10 forms a point of force application FP, and that the male engagement portion 10c of the front leg element 10 forms a point of action AP against the lock device 20. In that way, a second leverage is established to the front leg element 10. Therefore, under such second leverage, in the force F being imparted from the point of force FP to each of the two upper ends of the front leg element 10 under the preceding first leverage, the upward component B caused to the male engagement portion 10c (at AP) is particularly amplified relative to each fulcrum SP between the raised portion and the corresponding inclined region 10a-2, for which a person skilled in the art can understand by looking at FIG. 12. Consequently, both first and second leverages act on the front leg element 10 at the same time, whereby a far increased upward component B' is exerted on the male engagement portion 10c of the front leg element 10, as compared with the upward component B caused under the first leverage only. This means that the male engagement portion 10c is provided with a doubly amplified force that exceedingly overcomes the biasing force of the first and second inwardly-curved regions 22a and 22b of the lock device 20. Therefore, with this double leverage effect, a user can apply a very small force to the seat back SB to cause the male engagement portion 10c to pass through between the two inwardly-curved regions 22a and 22b to the outside of the lock device 20.

FIG. 9 shows a second embodiment of the vehicle seat 1, which suggests providing an under cover 30 to the underside of the seat 1, or between the seat cushion frame 6 and the seat slide device 2. In this embodiment, it should be noted that all the constituent elements and parts described in the foregoing first embodiment are used, excepting the under cover 30 only. Therefore, all like designations to be given hereinafter correspond to all like designations used in the foregoing first embodiment, and any further description is omitted as to the common elements and parts between the first and second embodiments.

As with the conventional art, the under cover 30 itself indeed conceals a corresponding area of the first floor area F1 under the seat 1, including the load-receiving support element 16, the lock device 20 and most of the seat slide rail 2, with a view to improving an aesthetic appearance of the underside of the seat 1. But, in addition thereto, the under cover 30 of the present invention functions to guide the front leg element 10 towards the lock device 20 and also guide the same 10 away from lock device 20 in a direction to the second floor area F2. Further, the under cover 30 functions to retain the front leg element 10 against movement and wobbling, when the male engagement portion 10c is engaged with the lock device 20. For that purpose, the under cover 30 is formed with the following regions:

- an opening region 33 defined in the front side of the under cover 30 at a location where the lock device 20 exists;
- an inner wall region 33d defined within the under cover 20 posteriorly of the opening region 33, the inner wall region being adapted to receive and support the first and second inclined regions 10a-2 and 10a-2 of the front leg element 10;
- a pair of spaced-apart notch regions 33a and 33a defined in the outer surface 33c of the under cover 30 at a location above the opening region 33;
- a sloped surface region 31 extending forwardly from the opening region 33 in a downward direction to the second floor area F2, wherein the sloped region 31 assumes a cambered contour as shown;
- a pair of guide surface regions 33b and 33b adjoining with and along the two lateral sides of the sloped surface region 31, respectively; and
- a lower end region 31a of substantially tongue or "U" shape which extends continuously from the sloped surface region 31 in a downward direction to either the second floor area F2 or the planar floor FL.

Figure 11:
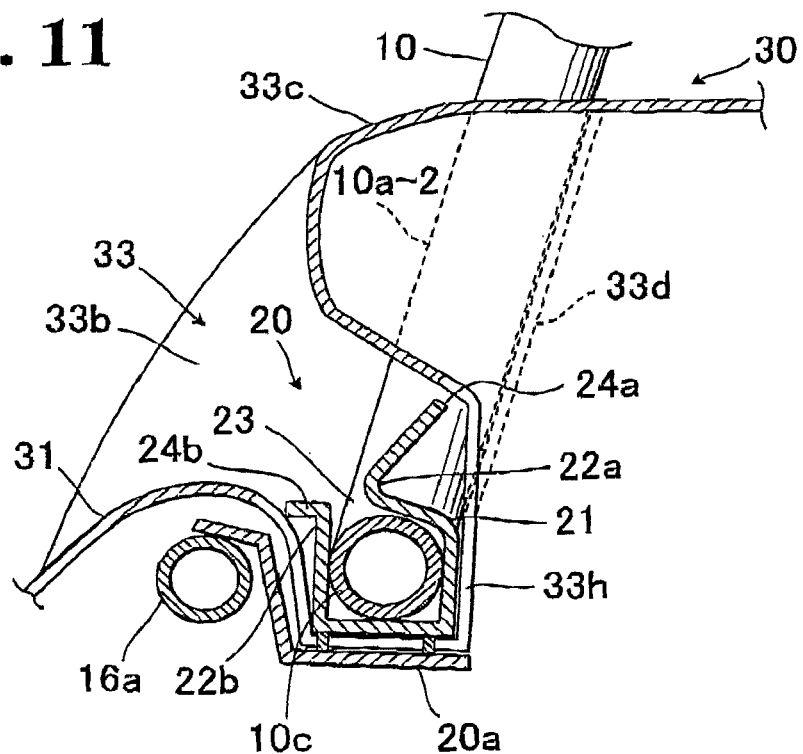
FIG. 11 is a fragmentary cross-sectional view of a principal part of the invention in accordance with the second embodiment, which shows a state where the male engagement portion of the front leg element is engaged in the lock device.

Specifically, the opening region 33 is so configured to allow ingress and egress therethrough of both male engagement portion 10c and lower inclined portions 10a-2 of the front leg element 10 into and from the inside of the under cover 30. As best shown in FIG. 11, inside of such opening region 33, the under cover 30 is provided with an inner recessed area that surrounds or houses substantially a whole of the lock device 20. Designation 33h denotes a hole formed in such inner recessed area of the under cover 30. This hole 33h allows both two guide pieces 24a and 24b of the lock device 20 to move and pass therethrough freely in outward and inward directions.

The sloped region 31 is shown to be recessed downwards from the outer surface 33c of the under cover 30. This particular sloped region 31 includes a cambered top portion 32 situated in the proximity of the opening region 33, wherein such cambered top portion 32 has an upwardly curved cross-section as viewed from FIG. 11. Note that the sloped region 31 has a width slightly larger than an entire length of the male engagement portion 10c of the front leg element 10.

Defined between the recessed sloped region 31 and the outer surface 33c are the two guide surface regions 33b and 33b, each being sloped downwardly in a direction from the outer surface 33c to the sloped region 31. Note that an angle of inclination of each of such downwardly-sloped guide surface regions 33b is substantially equal to an angle of inclination of each of the inclined regions 10a-2 of the front leg element 10. As observed in FIG. 9, the pair of guide surface regions 33b and 33b extend upwardly, while increasing their respective areas progressively, and terminate in the pair of notch regions 33a and 33a, respectively.

Each of the two notch regions 33a and 33a is so configured and disposed as to receive and retain a local part of each of the two inclined regions 10a-2 and 10a-2 therein, as best seen in FIG. 9.

Figure 10:
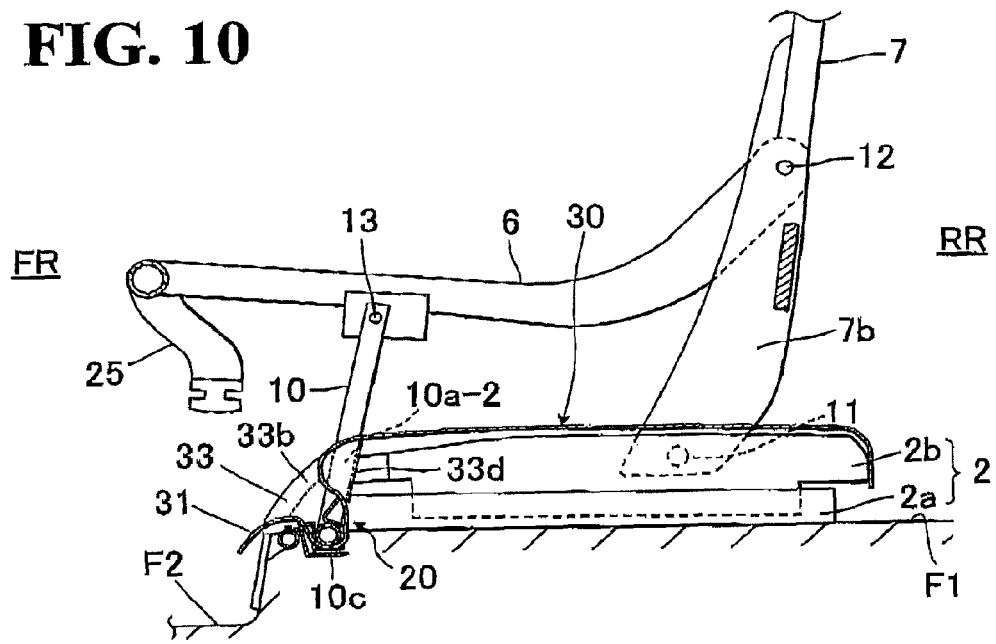
FIG. 10 is a sectional view taken along the line X-X in the FIG. 9.

When the front leg element 10 is locked by the lock device 20 to the load-receiving support element 16, the male engagement portion 10c is, of course, embracingly retained in the female engagement portion 21 of the lock device 20. Under this locked state, as shown in FIGS. 9, 10 and 11, the two inclined regions 10a-2 and 10a-2 of the front leg element 10 are partly engaged in the two notch regions 33a and 33a, respectively, whereby both front leg element 10 and seat cushion frame 6 are positively prevented from being moved and wobbled in the lateral direction (or left and right directions) thereof.

When a user folds the seat back SB or the seat back frame 7 forwardly and downwardly as indicated by the arrow in FIG. 5, the seat cushion frame 6 is automatically displaced in the arrow direction A under the previously described linkage, which in turns causes forward rotation of the front leg element 10 relative to the fourth pivotal point at 10c and 21. At this stage, the same first leverage as explained earlier is naturally established by the following three points: the top portion of the seat back frame 7 as a point of force application FP; the first pivot point at 11 as a fulcrum SP; and the second pivot point at 12 as a point of action AP. Hence, under such first leverage, an amplified force is applied to the third pivotal point at 13, attempting to draw the front leg element 10 upwardly away from the lock device 20 for disengagement of the male engagement portion 10c from the male engagement portion 21. In the present embodiment, referring to FIG. 12, it is to be understood that both two inclined regions 10a-2 and 10a-2 of the front leg element 10 are disengaged from the two notch regions 33a and 33a of the under cover 30, respectively, while being moved away from the inner wall region 33d on which the two regions 10a-2 and 10a-2 have been rested, and are brought into contact with the cambered top portion 32 of the under cover 30, prior to disengagement of the male engagement portion 10c from the female engagement portion 21. At this moment, in addition to the first leverage stated above, a second leverage is caused to the front leg element 10. In other words, a particular point in the cambered top portion 32, on which the two inclined regions 10a-2 of the front leg element 10 are contacted, forms a fulcrum SP. The third pivotal point 13 at the upper end of the front leg element 10 forms a point of force application FP. The male engagement portion 10c of the front leg element 10 forms a point of action AP. In that way, the second leverage is established to the front leg element 10. Therefore, in the force F being imparted from the point FP to the upper end of the front leg element 10 under the first leverage, the upward component B caused to the male engagement portion 10c (at AP) is particularly amplified relative to the fulcrum SP between the cambered top portion 32 and two inclined regions 10a-2 and 10a-2, as understandable from FIG. 12. Consequently, both first and second leverages act on the front leg element 10 at the same time, whereby a far increased upward component B' (see FIG. 12) is exerted on the male engagement portion 10c of the front leg element 10, as compared with the upward component B caused under the first leverage only. This means that the male engagement portion 10c is provided with a doubly amplified force that exceedingly overcomes the biasing force of the first and second inwardly-curved regions 22a and 22b of the lock device 20. Therefore, with this double leverage effect, a user can apply a very small force to the seat back SB to cause the male engagement portion 10c to pass through between the two inwardly-curved regions 22a and 22b.

Then, the user can continue the downward folding of the seat back SB or seat back frame 7, using his or her small force, with the result that the front leg element 10 is moved upwardly and forwardly as indicated by the arrow D, while the male engagement portion 10c passes through between the two inwardly-curved regions 22a and 22b, as shown in FIG. 12. With further downward folding the seat back frame 7, the seat cushion frame 6 advances in the arrow direction A, so that the male engagement portion 10c is moved away from the lock device 20 and rides on the cumbered top portion of the sloped region 31 of the under cover 30. Thereafter, as indicated by the one-dot chain line in FIG. 12, the male engagement portion 10c is slidingly moved on the sloped region 31 of the under cover 30 in the forward and downward directions, while the two inclined regions 10a-2 and 10a-2 are being slidingly moved on and along the two guide surface regions 33b and 33b, respectively.

It is to be noted that, instead of the under cover 30, one guide element may be provided adjacent to and anteriorly of the lock device 20, the guide element having suitable regions corresponding in shape and size to the afore-said sloped surface region 31, guide surface regions 33b, and lower end region 31a, respectively.

As shown in FIG. 13, the seat cushion frame 6 enters the second floor area F2 and is automatically rotated downwards thereto, under gravity, relative to the second pivotal point 12, so that both two contact portions 25b and 25b of the auxiliary support legs 25 and 25 are first brought into contact upon the second floor area F2. At this point of time, the front leg element 10 is, at its male engagement portion 10c, still being slidingly moved on the sloped region 31 of the under cover 30. Referring to FIG. 14, it can be observed that the seat back frame 7 has been folded close to the seat cushion frame 6, while the two auxiliary support legs 26 and 25 has been slidingly moved forwards on the surface of the second, floor area F2. During those actions, as understandable in FIGS. 13 and 14, the male engagement portion 10c of the front leg element 10 further slides on the lower end region 31a of the under cover 30 and is subsequently fallen therefrom toward the second floor area F2. Here, it is to be appreciated that a distance between the lower end region 31a and the second floor area F2 is so small that an impact given to the male engagement portion 10c from the second floor area F2 is extremely reduced, as opposed to the first embodiment wherein the male engagement portion 10c is directly fallen from the first floor area F1 to the second floor area F2. Therefore, in this second embodiment, the male engagement portion 10c gently contacts the second floor area F2, so that an objectionable noise generated therefrom is nearly eliminated or reduced to a much lower degree than in the first embodiment.

Subsequently, the seat back frame 7 or the seat back SB is folded onto the seat cushion frame 6 or the seat cushion SC, while both seat cushion SC and front leg element 10 slidingly advances on the second floor area F2, with the result that a whole of the seat cushion SC and seat back SB is set and stored at the second floor area F2, as indicated in FIG. 14.

In this connection, instead of the above-described seat folding operation, a seat cushion tip-up operation may be done for folding the seat cushion SC upwardly to the seat back SB as indicated by the one-dot chain lines in FIG. 4. In that case, the under cover 30 effectively conceals most of the seat slide device 2 as well as a whole portion of the first floor area F1 corresponding to the underside of the seat cushion SC that is normally set in the horizontal use position as indicated by the solid lines in FIG. 4, but now folded to a vertical storage position at the seat back SB as indicated by the one-dot chain lines in FIG. 4. Thus, especially after such seat cushion tip-up operation, the under cover 30 serves to aesthetically improve an outer appearance of the floor area F1 at the seat 1.

All the foregoing embodiments have been described for the instance where a forward-and-rearward seat adjustment device, such as the seat slide device 2, is applied to the vehicle seat 1. But, in the present invention, the seat 1 may be directly, fixedly mounted on either the planar floor FL or the first floor area F1, without using such forward-and-rearward seat adjustment device, because the actions of the above-described unique linkage are in no way dependent on the forward-and-rearward seat adjustment device or the seat slide device 2, but are done solely by folding and unfolding the seat back SB, in contrast to the conventional seat stated in the description of prior art.

Figure 15:
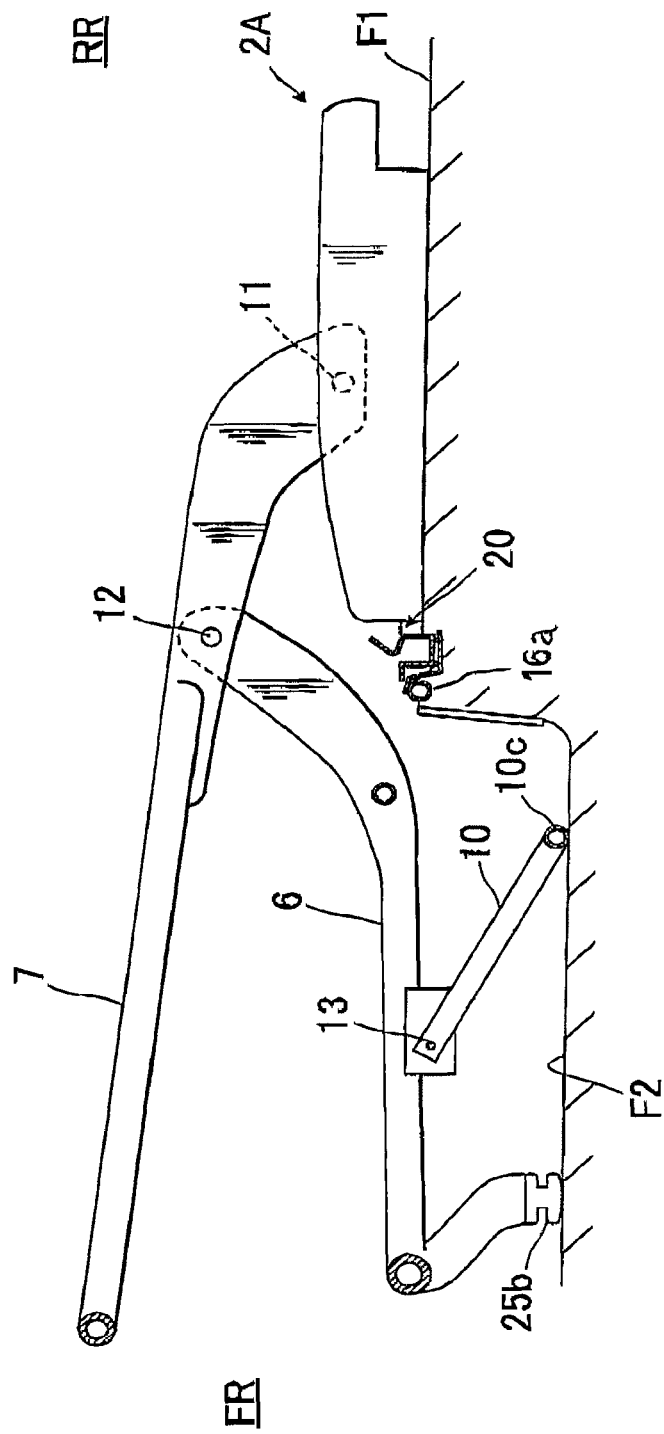
FIG. 15 is a diagram showing a third embodiment of the invention, which indicates that a pedestal may be provided between the vehicle seat and the first floor area, in place of the seat slide device.

As suggested in a third embodiment of FIG. 15, by way of one example, the vehicle seat 1 may be fixedly mounted, via a pedestal 2A, on the first floor area F1. In this embodiment, all the constituent elements and parts described in the first embodiment are used, excepting the pedestal 2A only. Therefore, all like designations to be given hereinafter correspond to all like designations in the foregoing first embodiment, and any further description is omitted as to the common elements and parts between the first and third embodiments. According to the present third embodiment, the lower end of the seat back frame 7 is pivotally connected to the pedestal 2A. Note that the pedestal 2a may be fixed on either the planar floor FL or the shown first floor area F1. The lock device 20 is fixedly attached to the front cross portion 16a of the load-receiving support element 16 firmly attached as by welding to the pedestal 2A. All the same actions and effects as described in the first embodiment are achievable in this particular third embodiment, for which any further description is omitted for the sake of simplicity.

Figure 16:
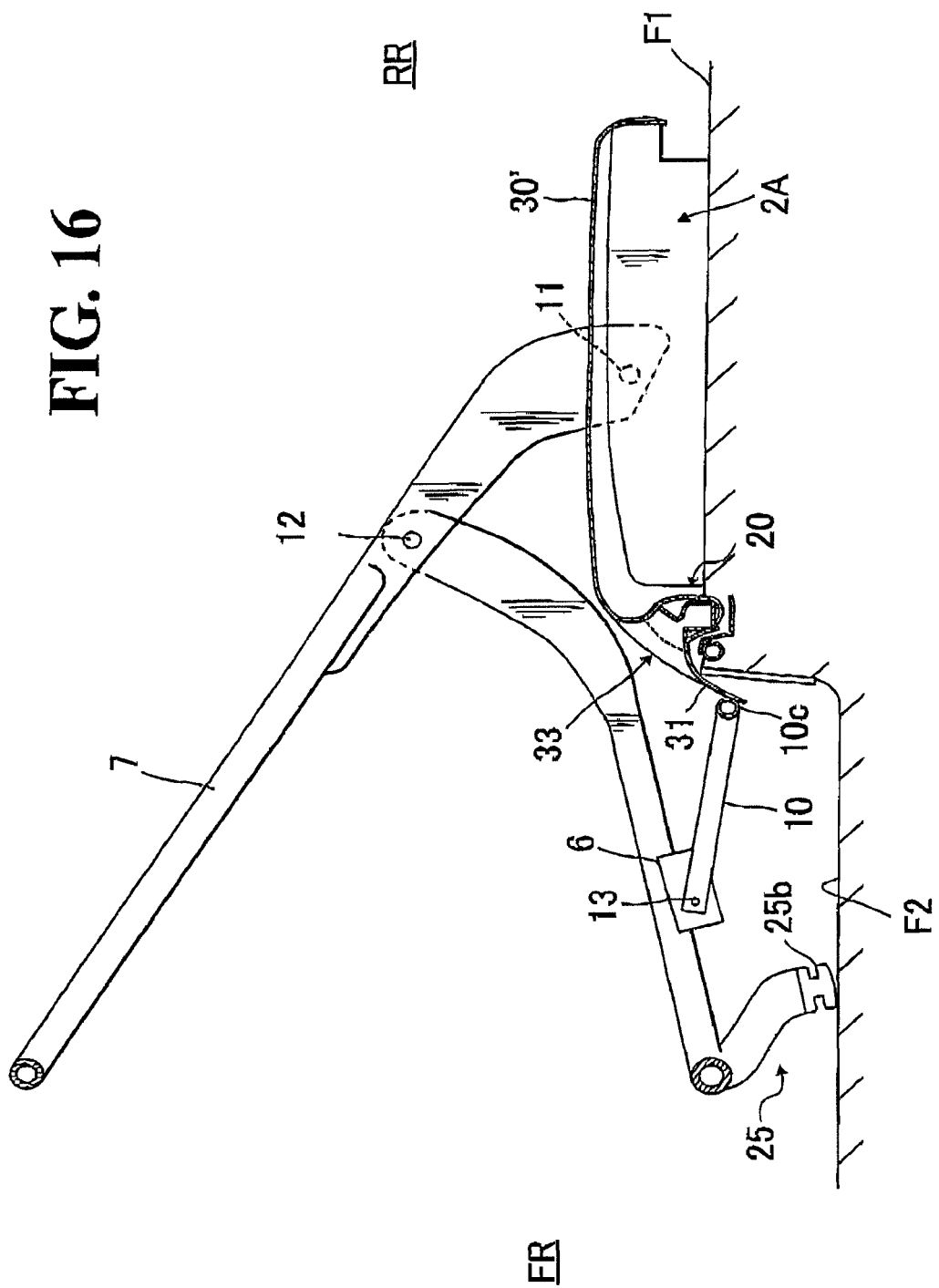
FIG. 16 is a diagram showing a fourth embodiment of the invention, which indicates that an under cover may be provided so as to cover a whole of the pedestal shown in the FIG. 15.

Also, as suggested in a fourth embodiment of FIG. 16, an under cover 30' may be used in the foregoing third embodiment. This under cover 30' is identical in structure to the first under cover 30 shown in FIGS. 9 and 10, only except that the shape and size of such under cover 30' is set so as to cover the pedestal 2A. In this fourth embodiment, as can be seen in FIG. 16, a whole of the pedestal 2A is concealed by the under cover 30', thus improving an outer aesthetic appearance under the vehicle seat 1. Of course, all the same actions and effects as described in the second and third embodiments are achievable in this fourth embodiment, for which any further description is omitted for the sake of simplicity.

While having described the present invention thus far, it should be understood that the invention is not limited to the illustrated embodiment, but any modification, replacement and addition may be applied thereto, without departing from the scope of the appended claims.

The invention claimed is:

1. A seat for use with a vehicle having a floor therein, wherein said seat comprises: a seat cushion; and a seat back foldable forwardly and downwardly onto said seat cushion, comprising:

a seat back frame provided in said seat back, said seat back frame being at a lower end thereof pivotally connected to said floor, thus defining a first pivotal point between said seat back frame and said floor;

a seat cushion frame provided in said seat cushion, said seat cushion frame being at a rearwardly-facing end thereof pivotally connected to said seat back frame, thus defining a second pivotal point between said seat cushion frame and said seat back frame;

a front leg element having an upper end pivotally connected to said seat cushion frame, thus defining a third pivotal point between said upper end of said front leg element and said seat cushion frame; and a lock device fixedly disposed at said floor;

wherein a lower end portion of said front leg element is releasably engaged in said lock device, thereby being normally in a locked relation with said floor, thus defining a fourth pivotal point between said lower end portion of said front leg element and said floor, wherein said first, second, third and fourth pivotal points establish a four-pivotal-point linkage among said seat back frame, said seat cushion frame, said front leg element and said floor; and wherein said four-pivotal-point linkage is normally maintained, and further comprising an element with which a lower part of said front leg element near to said fourth pivotal point is to be contacted, thereby limiting movement of said front leg element at said element, said element being defined at or adjacent to said floor and forming at fulcrum, wherein said third pivotal point forms a point of force application, to which a force is to be applied from said seat back frame, wherein said lower end portion of said front leg element forms a point of action against said lock device, whereupon a leverage is provided to said front leg element, and wherein, when said seat back frame is rotated forwardly and downwardly relative to said first pivotal point by an angle exceeding a predetermined angle, said lower part of said front leg element comes into contact with said element, whereby said force applied from said seat back frame is amplified under said leverage to facilitate disengagement of said lower end portion of said front leg element from said lock device, and under the thus-amplified force, said lower end portion of said front leg element is disengaged from said lock device, thereby destroying said four-pivotal-point linkage.

2. The seat as claimed in claim 1, which further comprises a guide element disposed between said lock device and said floor, said guide element being so configured and sloped as to allow said end portion of said front leg element to be guided therealong in a direction from said lock device towards said floor, and wherein said guide element includes: an upper end portion disposed adjacent to and anteriorly of said lock device; and a lower end portion extending downwardly and aslant towards said floor.

3. The seat as claimed in claim 1, which further comprises an under cover provided between the seat cushion frame and said floor, wherein said under cover includes a guide portion disposed between said lock device and said floor, said guide portion being so configured and sloped as to allow said end portion of said front leg element to be guided therealong in a direction from said lock device towards said floor, and wherein said guide portion includes; an upper end portion disposed adjacent to and anteriorly of said lock device; and a lower end portion extending downwardly and aslant towards said floor.

4. The seat as claimed in claim 1, which further comprises an under cover provided between said seat cushion frame and said floor, wherein said under cover includes a portion with which said lower part of said front leg element near to said fourth pivotal point is to be contacted, wherein said element comprises said portion of said under cover, so that said movement of said front leg element is limited at said portion, wherein said portion forms said fulcrum, and wherein when said seat back frame is rotated forwardly and downwardly relative to said first pivotal point by said angle exceeding said predetermined angle, said lower part of said front leg element comes into contact with said portion of said under cover, whereby said force applied from said seat back frame is amplified under said leverage to facilitate disengagement of said lower end portion of said front leg element from said lock device.

5. The seat according to claim 4, wherein said portion comprises an upwardly protruding portion provided to said under cover.

6. The seat according to claim 5, wherein said upwardly protruding portion comprises a cambered top portion formed integrally with said under cover.

7. A seat for use with a vehicle having a floor therein, wherein said seat comprises: a seat cushion; and a seat back foldable forwardly and downwardly onto said seat cushion, comprising:

a seat slide device operable for adjustment in position of said seat in forward and rearward directions of the seat, said seat slide device including a lower rail element fixedly mounted on said floor; and an upper rail element slidably engaged with said lower rail element;

a seat back frame provided in said seat back, said seat back frame being at a lower end thereof pivotally connected to said upper rail element of said seat slide device, thus defining a first pivotal point between said seat frame and said upper rail element;

a seat cushion frame provided in said seat cushion, said seat cushion frame being at a rearwardly-facing end thereof pivotally connected to said seat back frame, thus defining a second pivotal point between said seat cushion frame and said back frame;

a front leg element having an upper end pivotally connected to said seat cushion frame, thus defining a third pivotal point between said upper end of said front leg element and said cushion frame; and a lock device fixedly disposed at a location substantially corresponding to said upper rail element;

wherein a lower end portion of said front leg element is releasably engaged in said lock device, thereby being normally in a locked relation with said upper rail element of said seat slide device, thus defining a fourth pivotal point between said lower end portion of said front leg element and said upper rail element, wherein said first, second, third and fourth pivotal points establish a four-pivotal-point linkage among said seat back frame, said seat cushion frame, said front leg element and said seat slide device, wherein said four-pivotal-point linkage is normally maintained, and further comprising an element with which a lower part of said front leg element near to said fourth pivotal point is to be contacted, thereby limiting movement of said front leg element at said element, said element being defined at or adjacent to said upper rail element and forming a fulcrum, wherein said third pivotal point forms a point of force application, to which a force is to be applied from said seat back frame, wherein said lower end portion of said front leg element forms a point of action against said lock device, whereupon a leverage is provided to said front leg element, and wherein, when said seat back frame is rotated forwardly and downwardly relative to said first pivotal point by an angle exceeding a predetermined angle, said lower part of said front leg element comes into contact with said element, whereby said force applied from said seat back frame is amplified under said leverage to facilitate disengagement of said lower end portion of said front leg element from said lock device, and under the thus-amplified force, said lower end portion of said front leg element is disengaged from said lock device, thereby destroying said four-pivotal-point linkage.

8. The seat as claimed in claim 7, which further comprises a guide element disposed between said lock device and said floor, said guide element being so configured and sloped as to allow said end portion of said front leg element to be guided therealong in a direction from said lock device towards said floor, and wherein said guide element includes an upper end portion disposed adjacent to and anteriorly of said lock device; and a lower end portion extending downwardly and aslant towards said floor.

9. The seat as claimed in claim 7, which further comprises an under cover provided between the seat cushion frame and said floor, wherein said under cover includes a guide portion disposed between said lock device and said floor, said guide portion being so configured and sloped as to allow said end portion of said front leg element to be guided therealong in a direction from said lock device towards said floor, and wherein said guide portion includes; an upper end portion disposed adjacent to and anteriorly of said lock device; and a lower end portion extending downwardly and aslant towards said floor.

10. The seat as claimed in claim 7, which further comprises an under cover provided between said seat cushion frame and said floor, wherein said under cover includes a portion with which said lower part of said front leg element near to said fourth pivotal point is to be contacted, wherein said element comprises said portion of said under cover, so that said movement of said front leg element is limited at said portion, wherein said portion forms said fulcrum, and wherein when said seat back frame is rotated forwardly and downwardly relative to said first pivotal point by said angle exceeding said predetermined angle, said lower part of said front leg element comes into contact with said portion of said under cover, whereby said force applied from said seat back frame is amplified under said leverage to facilitate disengagement of said lower end portion of said front leg element from said lock device.

11. The seat according to claim 7, wherein said portion comprises an upwardly protruding portion provided to said under cover.

12. The seat according to claim 11, wherein said upwardly protruding portion comprises a cambered top portion formed integrally with said under cover.

* * * * *